US007875990B2

(12) United States Patent
Wang et al.

(10) Patent No.: US 7,875,990 B2
(45) Date of Patent: Jan. 25, 2011

(54) WIND-ENERGY POWER MACHINE AND STORAGE ENERGY POWER GENERATING SYSTEM AND WIND-DRIVEN POWER GENERATING SYSTEM

(76) Inventors: Ying Wang, RM 1802, 20$^{th}$ Bldg., Cuiyuan Xincum 5$^{th}$ Area, West Lake District 310012, Hangzhou (CN); Qingwan Lin, RM 1802, 20$^{th}$ Bldg., Cuiyuan Xincum 5$^{th}$ Area, West Lake District 310012, Hangzhou (CN)

( * ) Notice: Subject to any disclaimer, the term of this patent is extended or adjusted under 35 U.S.C. 154(b) by 727 days.

(21) Appl. No.: 11/884,255

(22) PCT Filed: Apr. 25, 2005

(86) PCT No.: PCT/CN2005/000564

§ 371 (c)(1),
(2), (4) Date: Oct. 15, 2007

(87) PCT Pub. No.: WO2006/084415

PCT Pub. Date: Aug. 17, 2006

(65) Prior Publication Data

US 2008/0157528 A1    Jul. 3, 2008

(30) Foreign Application Priority Data

Feb. 13, 2005    (CN)    ......................... 2005 1 0052381

(51) Int. Cl.
*F03B 13/00* (2006.01)
*H02P 9/04* (2006.01)
*F03D 9/00* (2006.01)

(52) U.S. Cl. ......................................... 290/43; 290/44

(58) Field of Classification Search .................. 290/44, 290/55, 43, 54; 415/4.1, 4.2, 4.5, 2.1, 907; 416/111, 117, 119, 132 B; 60/398
See application file for complete search history.

(56) References Cited

U.S. PATENT DOCUMENTS

| 2,230,526 | A | * | 2/1941 | Claytor | .......................... 290/44 |
| 4,031,702 | A | * | 6/1977 | Burnett et al. | ................. 60/398 |
| 4,079,264 | A | * | 3/1978 | Cohen | ........................... 290/55 |
| 4,113,408 | A | * | 9/1978 | Wurtz et al. | ................... 416/17 |
| 4,134,707 | A | * | 1/1979 | Ewers | ......................... 415/4.2 |

(Continued)

FOREIGN PATENT DOCUMENTS

CN    2030660    1/1989

(Continued)

*Primary Examiner*—Julio Gonzalez
(74) *Attorney, Agent, or Firm*—Hamre, Schumann, Mueller & Larson, P.C.

(57) ABSTRACT

The wind-energy power machine and storage energy power generating system and wind-driven power generation system belong to the field of wind-energy power machine and power generating and equipments technology. The wind-energy power machine consists of a center rotating body, several frame portions and a wind pressure push mechanism provided in each frame portion; the central rotating body of the wind-energy power machine is vertically and rotationally installed on the special high frame structure which has wind collection wall, it has extremely high wind utilizing efficiency and power generating effect through the large scale motor and power generating system constituted by vertical or the horizontal integrated system or the combined system of integration of vertical series connection and parallel connection.

9 Claims, 15 Drawing Sheets

U.S. PATENT DOCUMENTS

| | | | |
|---|---|---|---|
| 4,186,312 A * | 1/1980 | Dvorak | 290/4 R |
| 4,206,608 A * | 6/1980 | Bell | 60/698 |
| 4,229,661 A * | 10/1980 | Mead et al. | 290/44 |
| 4,245,958 A * | 1/1981 | Ewers | 416/197 A |
| 4,447,738 A * | 5/1984 | Allison | 290/44 |
| 4,818,180 A | 4/1989 | Liu | |
| 6,179,563 B1 * | 1/2001 | Minchey | 416/17 |
| 7,618,237 B2 * | 11/2009 | Lucas et al. | 416/119 |
| 2010/0109337 A1 * | 5/2010 | Wang et al. | 290/55 |

FOREIGN PATENT DOCUMENTS

| | | |
|---|---|---|
| CN | 2037004 | 5/1989 |
| CN | 1046373 | 10/1990 |
| CN | 1074978 | 8/1993 |
| CN | 2189654 | 2/1995 |
| CN | 1110761 | 10/1995 |
| CN | 1580547 | 2/2005 |
| JP | 2001-165034 | 6/2001 |

* cited by examiner

WIND-ENERGY POWER MACHINE AND STORAGE ENERGY POWER GENERATING SYSTEM AND WIND-DRIVEN POWER GENERATING SYSTEM

FIELD OF THE INVENTION

The wind-energy power machine and storage energy power generating system and wind-driven power generating system belong to a field of wind-energy power machine and power generating technology.

BACKGROUND OF THE INVENTION

The expected consumption and the shortage of the resources such as petroleum and coal etc., environment contaminant problem, cost and economic value as well as the society sustainable development all promote people to pay great attention to the new type energy and clean energy technology, and research them in great enthusiasm. The technology of wind-driven power generating system and its equipment manufacture have developed as a new industry branch, and the application is being increasing, however, regarding to the demand to energy and electric power and the percentage, the wind-driven power generating technology and its product and the total power generating quantity are still in the junior and passive situation, a great deal of installation of such wind-driven generator still rely on the government encouragement and preferential investment, the primary reason is that at present wind-driven generators and installations have many problems which restrict development, wind-driven generators and installations and natural requirements are to overcome many technical bottlenecks and make improvements.

At present the known wind-driven generators are most three-blade rotator direct reduction gear box and generator type, the utilization efficiency of the wind energy is low and the generating power is also low due to its structure and technology, again, it is installed on the high tower subjected to sunshine and rain, as a result the equipment trends to be damaged, and the maintenance difficult and cost high, its guide mechanism and brake device consume energy as well; in addition the wind-driven generator must be activated at the rotation beginning, therefore it can be envisaged that the activate moment must be large enough and the wind-driven generator can only rotate under sufficient wind speed, but it must rotate within a defined narrow wind speed range, otherwise wind-driven generator would damage, hence such type wind-driven generator has small effective power generating hours all the year round and is difficult to be large scaled, because the construction site must be selected at the region where the year wind energy resources are abundant, therefore the geographical and natural condition is substantial high, the site construction cost is high, these disadvantage factors make the investment reward rate very low and the investment callback period long, all these factors restrict and impede the development of wind-driven power generating system.

SUMMARY OF THE INVENTION

An object of the present invention is to provide a wind-driven generator, which is capable of solving the above mentioned problems with respect to the wind-driven generator and installations of the construction site, which seeks to generate more power and more electric energy within fewer footprint, while it reduces the investment for the construction site and the operation cost, and improves to utilize wind energy and popularize the power generating in order to gain excellent economic effects.

To achieve the object, the present invention is through the following technical solution realized.

A wind-energy power machine includes a vertically installed rotational center rotating body 1 around which there are several equally distributed frame portions 2, each frame portion has a wind pressure push mechanism 3; the wind pressure push mechanism 3 has symmetric and horizontal support shafts 3b on two vertical outer side surfaces at the location which is slightly above the midpoint measured from the bottom in the height of the side surfaces, or at any locations away from the above mentioned location within a certain distance, and the wind pressure push mechanism is installed on the frame portions 2 at the same vertical height by means of bearings 3d, due to the support position of the support shafts 3b the support shaft serves as the horizontal centerline of the wind pressure push mechanism, the weight of the lower portion volume is slightly heavier than the upper portion volume, which makes the wind pressure push mechanism easily overturn towards upper to raise and open when it is against the wind, so that a whole wind-bearing surface is parallel to the wind direction or keeps an almost parallel state without wind resistance, while in the process of a free wind the wind pressure push mechanism returns to close against the frame portions 2 under the action of the slightly heavier weight of the lower portion and the air stream, so that the whole wind-bearing surface is perpendicular to the wind direction or keeps an almost perpendicular state receiving the wind force, thus, the wind-energy power machine A is formed, which can directionally rotate to output power in the way that it receives wind from any direction to form the driving force.

The upper and lower end shaft portion 1b, 1a of the above described center rotating body 1 are provided with bearings 6a, 6, hence the wind-energy power machine is vertically installed on a high frame or an independent frame E or a high frame structure B, which provides stable rotation for the wind-energy power machine, the both shaft portions 1c, 1d of the center rotating body are also provided with a clutch 7 or a coupling 7a according to the different demand of the constitution of the power transmission, the shaft portion 1C which serves as the terminal power output of the wind-energy power machine is provided with a transmission member 10 or 15 as well.

The above described frame portion 2 comprises a column 2a, a lower cross beam 2b, an upper cross beam 2c and an outer side column 2d. At the location which is measured from the bottom in the height of the outer side column and the column of frame portion in the vertical direction slightly above the midpoint, or at any location away from the above mentioned location within certain a distance, symmetric threaded holes or through-holes having one level centerline and being symmetrical are provided on the outer side column and the column. The wind pressure push mechanism 3 is installed by the seat bearing 3d by means of bolts; the column has through-holes 2e at many locations so as to install the frame portions 2 onto the center rotating body 1 with fasteners; the outer side column is provided with an adjustment device 2f which adjusts the opening degree of the wind pressure push mechanism.

The wind pressure push mechanism 3 has a concave body 3a, which has a front surface receiving the wind and having a concave shape so that it can accumulate the wind energy to strengthen push force, the bottom of its frame has a positioning plate 3c.

The above described wind pressure push mechanism can also be mounted on the outer side column 2d and an inner side column 2f which is installed on the upper and lower cross beams of the frame portions 2 away from the center rotating body with a certain distance to form a larger leverage.

A wind-energy power machine includes a vertically installed rotational center rotating body 1 around which there are several equally distributed frame portions 4, each frame portion has a wind pressure push mechanism 5 which can change with the wind direction and follow the bias vertical shaft center of the centerline of a support shaft 5b and a support shaft cam set 5c to make settings for the function demands when it is against the wind to automatically open, so the whole wind-bearing surface is parallel to the wind direction or keeps an almost parallel state without wind resistance, while in the process of a free wind the wind pressure push mechanism self closes, so the whole wind-bearing surface receives the wind push action, the centrifugal force generated by the wind pressure push mechanism when the wind-energy power machine A is rotating can be balanced by balance servo devices 5c, 5g, and it returns to close in cooperation with the free wind, that is, it rotates when its rotation direction conforms with the wind direction, such that the wind-energy power machine A is formed which can directionally rotate to output power in the way that it receives any wind from any direction to form the driving action.

The upper and lower end shaft portions of the above described center rotating body 1 are provided with bearings 6a, 6, hence the wind-energy power machine is vertically installed on the independent frame or high frame structure which builds a wind-energy power machine A that independently provides power, or the wind-energy power machine is installed in a large scale high frame structure B which is designed and planned to install more wind-energy power machines; the both shaft portions 1c, 1d of the center rotating body are also provided with a clutch 7 or couplings 7a, the lower shaft portion is provided with a brake 8, the shaft portion 1C of the wind-energy power machine A which serves as the terminal power output is provided with a transmission member 10 or 15 as well.

The frame portion 4 comprises an upper cross beam 4b and a lower cross beam 4a, the upper and lower cross beams 4b, 4a near the center rotating body have through-holes 4C so that the upper and lower cross beams can be assembled with the fix plate 1e of the center rotating body with bolts; each of outer ends of the upper and lower cross beams of each frame portion far away from the center rotating body with a certain distance has threaded holes or through-holes 4d being symmetric with each other for installing the support shaft cam set 5C and/or support shaft 5b of the wind pressure push mechanism 5 with the seat bearings, the upper cross beam is provided with a centrifugal force balance device 5g, and the contact location with the fix plate 5f of the upper and lower cross beams has a damper cushion 4e; the centrifugal force balance device 5g has a hollow cylinder 5g1, a compression spring 5g2 is provided inside, an inner end thereof is tied with tie cord 5g3, a front end thereof is provided with a small roller 5g4, the tie cord is connected thereon and one end of the tension spring is connected to a lug 5e; the half of the tie cord is a flexible steel cable and the other half of the cord is a tension spring.

The wind pressure push mechanism 5 is a concave body 5a: 5a1, 5a2, which has a front surface receiving the wind and having a concave shape so that it can accumulate the wind energy to strengthen the push force, at any position of the body within a certain range which is apart from the ⅔ width of the horizontal width of the upper and lower frame measured outside from the side near the center rotating body or at least above ½ width a definite distance, a support shaft 5b is provided on the upper frame, the bottom plane of the lower frame is provided with a centrifugal force balance servo device; a female cam in a pair of mate male and female support shaft cam set 5C: 5C1, 5C2 is installed on the corresponding lower cross beam 4a of the frame portion, the female cam 5C1 also has male and female adjustable positioning rack 5C3 which may adjust the open degree of the wind pressure push mechanism 5 and restrict the centrifugal force, the male and female cams match with each other in the inclination between 25 and 55 degree; the support shaft 5b is installed on the upper cross beam with a seat slide bearing 5d, it can be controlled to rotate with the vertical centerline of the support shaft and the support shaft cam as the center of rotation according to the defined rotation degree and the automatic open and close function demand; a fix plate 5f is provided at the upper and lower locations at the outer side of the wide side of the centerline.

An energy storage power generating system includes two motor units and their equipments which use the energy, one of the motor units is a main power source which constantly rotates when there is wind, it includes at least one to a multiple of wind-energy power machines A:A1,A2 ... An which drive generator G in operation to generate electricity, or it transmits the power through a power output shaft 17, the clutch 7, a gear that connect the power output end gear of the corresponding wind-energy power machine to a first common transmission shaft 18 provided with a constant speed controller 9, the power is then through transmission member 10, 11 transmitted to the second common transmission shaft 19 which is shared by the standby power source, and the common transmission member 10, 11 drive the generator G to generate electricity, or through the integration of vertical series connection and parallel connection combined system AB the generator is driven to generate electricity.

The other motor unit is a standby power source, it includes at least one to a multiple of wind-energy power machines A:A1 ... An, at least one to a multiple of air compressors W:W1 ... Wn, which generate high pressurized air, and sufficient containers T:T1 ... Tn which accumulate the pressurized air and at least a turbine S which uses the pressurized air to generate rotation power or a pneumatic motor R or a fluid pump 100, and a high pressure air piping U and a solenoid valve V as well as sub-container 21 provided on each floor; the at least one to a multiple of wind-energy power machines drive the air compressors to do work, or through the power output shaft 17, the clutch 7, the bevel gear 15 which connects with the respective wind-energy power machine the power is transmitted to a common transmission shaft 20, the transmission member 10, 11 or the reduction gearbox Q drive the air compressor to do work, or through the integration of vertical series connection and parallel connection combined system AB the power is transmitted to drive the air compressor in operation, the generated pressurized air is accumulated in the containers; the connection piping U between the container of the air compressor and the next container is provided with a check valve Y, the solenoid valve v and the throttle valve V1 are provided in the piping U between the container and the turbine or the pneumatic motor or the fluid pump; the turbine and the pneumatic motor are driven in operation by the pressurized air supplied by the container, and through the second common transmission shaft, the clutch and the common transmission member the generator is driven to generate electricity.

The above described containers are provided with the piping connected with the sub-containers 21 provided on each floor, the sub-containers supply the pressurized air through a solenoid valve 24, a piping 23 to the cylinder 22 or the pneumatic motor or pneumatic clutch of the rolling door; the necessary location of the above described power output shaft, the common transmission shaft 17, 18, 19, 20 are provided with the support bearing 6 and the clutch 7, in addition the necessary location of the common transmission shaft is provided with the coupling 7a.

The described motor units as the main power source and as the standby power source are selected by means of an automatic controller system which controls the time to alternately operate the motor unit, the controlling mode or program is as follows: if there is natural wind, both the wind-energy power machine units and the air compressor set or the fluid pump operate simultaneously to do work, but the turbine S or the pneumatic motor R or the water-wheel machine 100 is in the shutdown state, the clutch on the second common transmission shaft 19 is disconnected, the motor unit as the main power source drives the generator G in operation to generate electricity.

When the natural wind blows so weakly that the speed of the motor unit as main power source or the power output or the generator power is lower than a predetermined value, the automatic controller system sends a command to disconnect the clutch of the first common transmission shaft 18, at the same time the solenoid valve automatically opens, the throttle valve V1 controls the flow rate of the pressurized air in the container, the pressurized air is inputted into the turbine or the pneumatic motor and the rotation power is generated, the clutch of the second common transmission is automatically closed, the output power drives the generator to generate electricity, or it controls and drives the water-wheel machine and power generating unit to generate electricity.

Another constitution of the motor unit as standby power source for the A energy storage power generating system includes at least one to a multiple of wind-energy power machines A:A1 . . . An, at least one fluid pump 100 . . . 100n, one upper reservoir 200 and one lower reservoir and water-wheel machine 300; the wind-energy power machine drives the fluid pump in operation to do work, or through the power transmission shaft 17, the clutch 7, the bevel gear 15 which connect the respective wind-energy power machine the power is transmitted to the common transmission shaft 20 with the coupling 7a supported by a bracket and the seat bearing 6, the transmission member 10, 11 drives the fluid pump in operation, or through the integration of vertical series connection and parallel connection combined system AB the fluid pump is driven in operation, the water is drawn to the upper reservoir through the input piping 102 and output piping 101 connected with the lower reservoir, and then through the piping 201, a connected solenoid valve 202 and the throttle valve the water controls and drives the water-wheel machine in operation to output the power in order to drive the generator in operation to generate electricity.

The integration of vertical series connection and parallel connection combined system AB constitutes as follows. A multiple of wind-energy power machines A of the motor unit as the main power source are installed on each floor of the high frame structure B respectively in aligned with each other in the same common vertical axis and vertically installed on the installation frame N1, N2 with the bearings 6, 6a, the air compressor W, the container T, the turbine S or the pneumatic motor and the generator G are installed on one of the floors, hence there are both upper and lower motor units, or the wind-energy power machines in series connection on several upper or lower floors constitutes one motor unit, each wind-energy power machines A of each unit is connected with the clutch 7 or coupling 7a, while the wind-energy power machines A of the power output end of the motor unit need in connection with the clutch 7 and the first transmission shaft 12; the motor unit as the standby power source may constitute in the same way.

The motor unit as the main power source transmits the power through the first transmission shaft 12, the bevel gear 15 or gear and the connected reduction gearbox Q, the clutch 7 and the common transmission member 10, 11 to drive the generator in operation to generate electricity. The motor unit as the standby power source transmits the power through the bevel gear or gear of the first transmission shaft 12, the transmission shaft 25, the reduction gearbox Q and the common transmission member 10, 11 to drive the air compressor to do work, the pressurized air is accumulated in the containers T; when the speed or the output power of the motor unit as the main power source or generator is lower than the predetermined value or the generator doesn't do work, the automatic controller system controls the clutch on the unit end to be disconnected, the solenoid valve V and the throttle valve V1 in the piping connected with container and turbine S automatically open, the pressurized air enters through piping U into the turbine S or the pneumatic motor R, they output the rotation power through the transmission shaft 26, common transmission member 10, 11 to drive the generator in operation to generate electricity.

An energy storage power generating system includes an automatic control system, at least one to a multiple of wind-energy power machines A:A1 . . . An, at least one to a multiple of air compressors W:W1 . . . Wn, a multiple of pressurized air containers T:T1 . . . Tn, at least one turbine S or pneumatic motor R or fluid pump 100 and water-wheel machine, a pressurized air piping U, a solenoid valve V and a throttle valve V1 and a generator G; the at least one or a multiple of wind-energy power machines drive the air compressor 15 to do work, or through the power output shaft 17 which connects the wind-energy power machine, the clutch 7, the bevel gear 15 the power is transmitted to the common transmission shaft 20, the transmission member 10,11 or the reduction gearbox to drive the air compressor in operation, or through the integration of vertical series connection and parallel connection combined system AB the power is transmitted to drive the air compressor in operation, the generated pressurized air is accumulated in the containers; the connection piping U between the container and the next container of the air compressor is provided with the check valve Y, the solenoid valve and the throttle valve are provided in the piping between the container and the turbine or the pneumatic motor or the fluid pump; the turbine or the pneumatic motor are driven in operation by the pressurized air supplied by the containers and directly drives the generator in operation, or through the second common transmission shaft, the clutch and the common transmission member the generator is driven to generate electricity.

According to the output strength of the wind-energy power machine or the speed change which is set by the system the standard value is compared, the automatic control system estimates, controls and selects the required rotation of the matched air compressor, and optimizes the operation efficiency; the automatic control system also controls the opening and closing of the solenoid valve and operates the throttle valve so that it controls the output power of the turbine or the pneumatic motor or the fluid pump and the operation of the clutch.

The above described container is provided with the piping connected with subsidiary container 21 on each floors, the pressurized air is supplied through the solenoid valve 24, the piping 23 to the cylinder 22 and pneumatic motor or the pneumatic clutch for the rolling door L; the power output shaft, the common transmission shaft 19, 20 have support component with the seat bearing 6 and the clutch 7 on the necessary locations, the common transmission shaft is also provided with the coupling 7a on the necessary location.

A wind-driven power generating system includes a multiple of wind-energy power machines A and generators G which constitute a multiple of generator units, or certain quantity of wind-energy power machines A are provided on the large special open high level frame structure B through the vertical integration system C or horizontal integration system D or the combination of systems C, D, so that it is possible to construct a motor unit with larger power, and furthermore connected with a generator to become a large scale power generating unit, it is also possible to arrange many large scale power generating units and output electricity respectively, or the combination of respective large scale power generating unit and substation can constitute larger scale power generating system.

The floor height, total height and the area of the above described high frame structure B can be designed and planned according to the demand of power and scale, there is partitioned floor F between two stories, but there is no fixed wall body in the surroundings, however, there is a shield such as a movable rolling door L which is activated pneumatically or electrically, the shield is used to block off the wind from all directions when there is storm or when the equipment needs to be maintained.

There is an impermeable wind collection wall M which integrally extends in a certain length in the southeast, northeast, northwest and southwest direction of the frame structure B, the wall body only on the side near the column B1 of the frame structure has a movable window M1 from which the wind cab escape and which can be opened and closed by a pneumatic cylinder 22 or an electrical windlass and which is same level as each floor; on the wind collection wall M2 and the top platform of the frame structure B are provided with power generating device M3 with a plurality of photoelectric tubes which can generate electricity, the generated electricity can be transmitted to the power supply network of the present system. The frame structure has a lift inside.

The frame structure B has installation frame N1, N2 for mounting the wind-energy power machines in the location where the wind-energy power machine A is installed in the inside space of each floor, each center rotating body 1 of the wind-energy power machine in this location on each floor lies in the same vertical centerline, there is an installation window O in the respective floor so that each wind-energy power machine which aligns with each other on each floor can be connected with the clutch 7 or the coupling 7a.

According to the rotation speed range of the wind-energy power machine, the automatic control system or the anemometer P provided outside the frame structure B detects the wind strength and outputs signals to the control system to automatically control the pneumatically or electrically activated rolling door and the open degree of the wind collection window, so as to control and adjust the override wind which surpasses the predetermined value within the defined range, so that the wind-energy power machine can steadily and credibly rotate to provide power; fully closing the rolling door enables all the wind-energy power machines to stop operation, and locally closing the respective rolling door or the brake 8 enables the single wind-energy power machine to stop operation; it is also possible to select the opening and closing by manually controlling or manually operation through the control panel K of the control system.

The vertical integration system C can connect the wind-energy power machines on several floors with clutch 7 or coupling 7a so as to constitute a large scale motor unit with large power, the wind-energy power machine with terminal power output connects the first transmission shaft 12 with the clutch 7, the bevel gear 15 on the shaft is engaged with the input shaft gear of the reduction gearbox Q, the power output shaft of the reduction gearbox Q is connected with generator G through the coupling, the generator is driven to generate electricity.

Each wind-energy power machine is vertically installed on the installation frame N1, N2 with the bearings 6, 6a mounted on the shaft portions 1a, 1b of the center rotating body; the installation frame N1 is provided on the floor cross beam B2 with a certain height, the lower portion forms a space which receives the clutch 7; the lower shaft portion 1C of the center rotating body penetrates the through-hole O of the middle installation frame, and the upper shaft portion 1d of the center rotating body of the lower wind-energy power machine penetrates the installation window O of the floor, they are connected by means of the clutch 7 in this space, the installation frame N2 is provided on the bottom or upper portion of the upper floor.

The horizontal integration system D and the generator G are provided between two wind-energy power machines A, the two wind-energy power machines transmit the power to the respective horizontal transmission shaft 13 through the bevel gear 15 of the respective center rotating body 1, again through the clutch 7 connected with the horizontal common transmission shaft 14 provided with constant speed controller 9, transmission member 10,11 to transmit power in order to drive the generator in operation to generate electricity; the horizontal transmission shaft and the horizontal common transmission shaft are installed on the cross beam B2 of the floor with bracket and bearing 16; the above described transmission member 10 may be a sprocket or gear belt wheel or belt wheel or general gear, the transmission member 11 may be a chain or gear belt or belt.

Furthermore, all the wind-energy power machines can also transmit power through a front transmission shaft having the clutch 7, one end of the shaft is engaged with the gear on the lower shaft portion of the center rotating body of the wind-energy power machine, the gear on the other end is engaged with the gear on the horizontal transmission shaft 13, each wind-energy power machine may output power or disconnect power through the clutch provided on the transmission shaft; each wind-energy power machine is vertically installed on the installation frame N1,N2 with the bearings 6a, 6 provided on the upper and lower portions of the center rotating body.

The benefit effect of the wind-energy power machine and its energy storage power generating system and the wind-driven power generating system according to the present invention mainly consists in that it utilizes the natural wind energy as the power source, the wind-energy power machine doesn't directly drive the generator when the wind-energy power machine starts, it starts under light loading, thereafter it connects the generator through the clutch or the vertical integration system or the horizontal integration system or the combined system of the vertical series connection and parallel connection to make the generator rotation to generate electricity, therefore it is possible to drive the wind-energy power machine under light wind, whereas it is possible to gain stronger wind power even if the wind speed is lower through the wind accumulation action of the wind collection wall, thereby the wind-energy power machine can operate more effectively; in addition the site selection of the construction for the wind-energy power machine and its power generating system is easier to popularize than the general wind-driven generator which is restricted by the natural condition of the geographical environment, its prospect of developing and utilizing the wind energy resources is very good;

in that, the wind-energy power machine has maximal expandability of the power capability of single motor, and the larger power scale and the power generating capability of the large scale power generating system are formed by means of the vertical series connection and the parallel connection or the vertical and the horizontal integration system, the popularization of the wind-energy power machine can reduce the reliance on the fossil power plant and eliminate the negative influence to the environment, it is helpful to the flourish of the economic development and the optimization of the natural environment.

in that, the present wind-energy power machine is not restricted by any wind direction, the wind from any direction can drive the wind-energy power machine to rotate in the same direction without guide mechanism which consumes energy as the general wind-driven generator, and increase the wind efficiency; regarding to the structure it can safely operate under strong wind circumstance, its wind area is large and the surface receiving wind is perpendicular to the wind direction, hence the wind efficiency is very high.

in that, the energy storage power system accumulates the wind energy when the wind blows, when there is no wind, the accumulated energy is gradually released to drive the turbine or the pneumatic motor or the fluid pump and the water-wheel machine and drive the generator in operation to generate electricity, this increases the effective power generating hours and power generating quantity with the wind-driven power generating.

in that, the construction of the power plant may develop towards to the high space utilizing the high frame structure which sufficiently uses the integration towards the high space, the construction footprint may reduce several times, tens times or more in comparison with conventional construction way of the wind-driven power generating site under the same capacity of power generating, it can save a large quantity of construction field; it has been proved that the strength of air stream in the high space is several times as that in the lower space, therefore it can be understood that the power generating efficiency and the effect of the wind-driven power plant according to the present invention which uses the high space are several times as that of the conventional wind-driven power plant which uses the windmill; integrating the function and the benefit effect, the present invention will create better life for the human.

BRIEF DESCRIPTION OF THE DRAWINGS

FIG. 7-1 is a A-A section view; FIG. 7-2 is a right side view.

FIG. 9-1 is a top view; FIG. 9-2 is a positioning male rack.

DETAILED DESCRIPTION OF THE EMBODIMENTS

The embodiments of the invention will now be described in detail with reference to the accompanying drawings.

Figure 1:
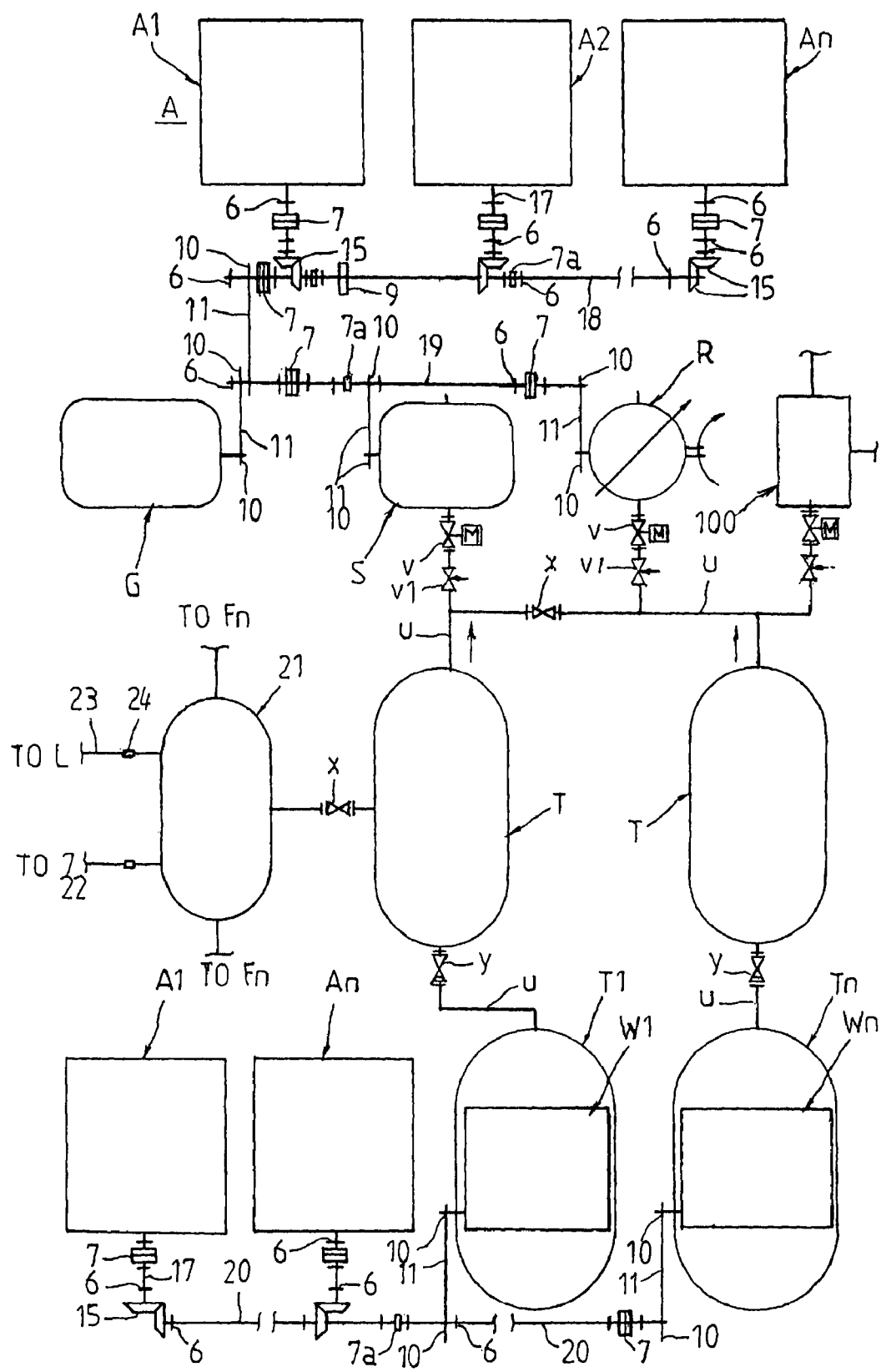
FIG. 1 is a schematic plane view of the storage energy power generating system according to the present invention.

Firstly referring to FIG. 1, a storage energy power generating system comprises two series of motor units and a power generating mechanism, in which one motor unit mainly provides power to drive generator as the main power source for electricity generation when there is natural wind energy; it includes at least one to a multiple of wind-energy power machines A:A1, A2 . . . An, each wind-energy power machine transmits power through power output shaft 17 to the first common transmission shaft 18, power output shaft is supported by the support component with the bearing 6, in which there is provided with a clutch which controls power transmission or disconnection individually, this makes individual wind-energy power machine not affect any one wind-energy power machine in totality when it stops operation for maintenance; the front end gear of the power output shaft is each engaged with the gear on the lower end portion 1c of the center rotating body for the respective wind-energy power machine or connected in transmission, the bevel gear 15 of the distal end of the power output shaft 17 is engaged with the bevel gear 15 of the first common transmission shaft, the first common transmission shaft transmits the power through the clutch 7, transmission members 10, 11 to the second common transmission shaft 19, and again through the sprocket of the common transmission member and chain or through gear and belt or through suitable form of other power transmission drive the generator G to generate electricity; the first common transmission shaft comprises several shafts which are connected with coupling 7*a*, between the shafts there is provided with constant speed controller 9, the shaft end is provided with clutch 7 in order to control the power output or disconnection, the first and second common transmission shaft are provided with coupling 7*a* at suitable shaft section, and secured by the seat bearing 6 and support member on the cross beam B2 or B3.

When the motor unit as the main power source rotates to drive the generator G for electricity generation, the turbine S or the pneumatic motor R or the water-wheel machine 300 of the motor unit as standby power source stays at shutdown state not to operate to transmit power, at the same time the clutch at the power output end of the second common transmission shaft is opened, but the wind-energy power machine unit as the standby power source and the air compressor W unit or the fluid pump 100 are working for energy storage.

The other series of the motor unit as the standby power source includes at least one to a multiple of wind-energy power machines A:A1 . . . An) at least one to a multiple of air compressors W:W1 . . . Wn, and enough number of high pressure energy storage containers T:T1 . . . Tn and at least one turbine S or the pneumatic motor R or the fluid pump 100 and the water-wheel machine 300, and pressurized gas transmission piping U and solenoid valve V, throttle valve V1 and generator G; by means of the power output shaft 17 which links the power output end gear of the wind-energy power machine, the power is transmitted to the common transmission shaft 20, and through the transmission member 10,11 the air compressors W is driven in operation; the front end gear of each power output shaft is respectively engaged with the gear on the lower end portion 1*c* of the center rotating body 1, or connected with transmission member in suitable way; each power output shaft is supported and secured by the support component with bearing 6, in which there is provided with a clutch 7 which controls power transmission or disconnection individually, this makes any individual wind-energy power machine not affect other wind-energy power machine in totality due to its shutdown; the other end bevel gear of each power output shaft is respectively engaged with the bevel gear 15 provided on the common transmission shaft 20, the coupling 7*a* connects two or several common transmission shaft 20, and is supported by the support component with bearing 6.

The check valve is provided in the piping U between the energy storage container T and the next energy storage container T of the compressor; throttle valve V1 and solenoid valve V is provided in the piping U connecting the energy storage container with turbine and pneumatic motor or fluid pump, between two piping there is further provided parallel connection bypass gate valve X; in addition, energy storage container transmits the pressurized gas through a piping and the valve X to the subsidiary energy storage container 21 provided on each floor, the link line of the energy storage container connects to the pneumatic motor of the pneumatically rolling door L and the cylinder 22 or the pneumatic clutch which opens and closes the door and window of the wind collection wall, and when the cylinder and pneumatic motor or the pneumatic clutch are to operate, the solenoid valve 24 receives command to open and output pressurized gas.

The motor unit as main power source and as standby power source may use integration of combination system of vertical series connection and parallel connection or other suitable way to transmit power so that it drives generator to generate electricity; utilizing wind-energy power machine A which is prone to integrate the expandable function and the large special open high level frame structure B, through the integration of combination system of vertical series connection and parallel connection, the construction of energy storage power generating system towards the high space may constitute the large-scale and high effective all-weather power plant.

Figure 2:
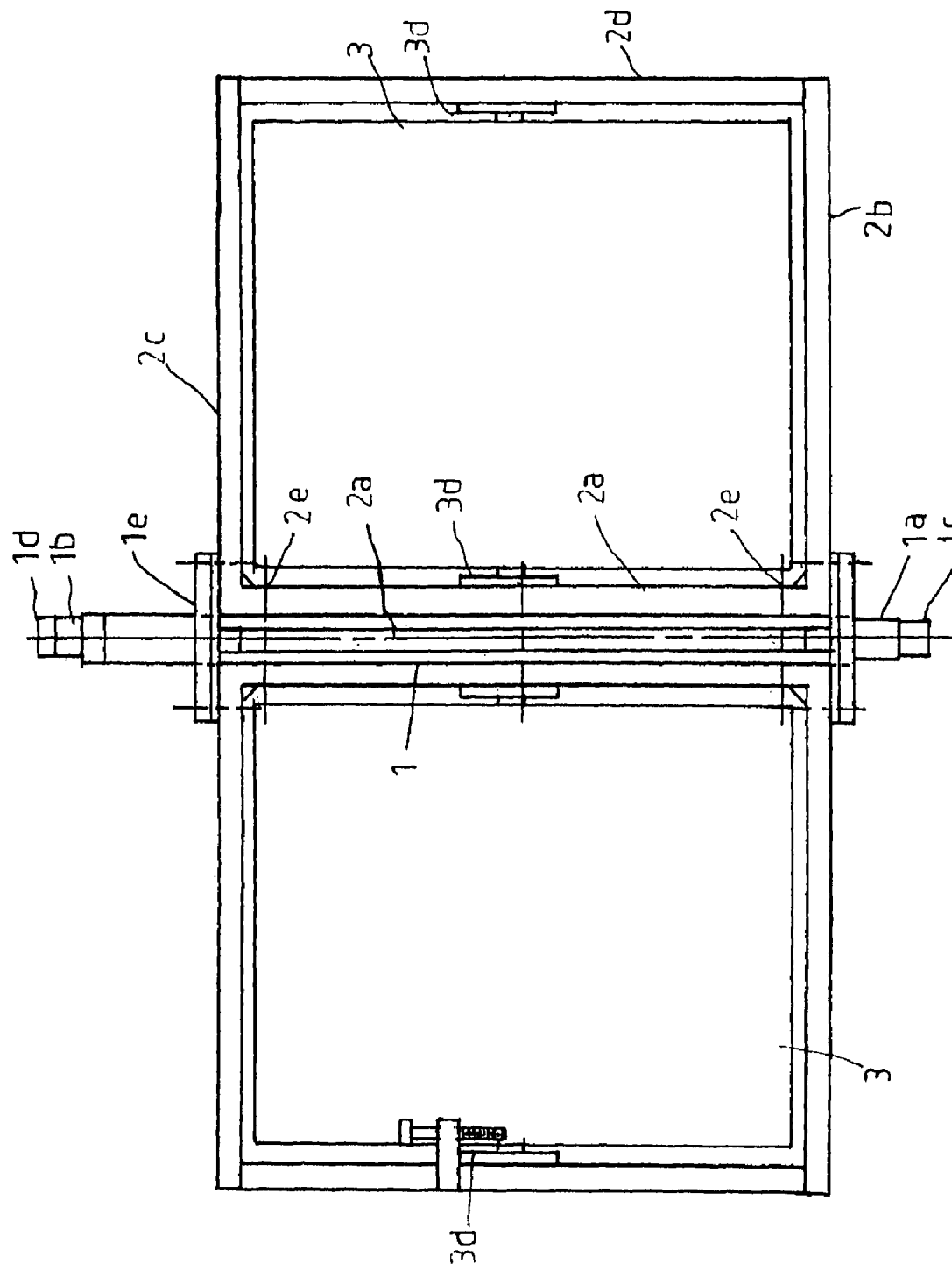
FIG. 2 is a front view of the wind-energy power machine according to the present invention showing the center rotating body 1, frame 2 and wind pressure push mechanism 3.

FIG. 2 shows the static and basic constitution having a center rotating body 1, a frame 2 and a wind pressure push mechanism 3 for the wind-energy power machine A, the column 2*a*, lower cross beam 2*b*, upper cross beam 2*c* and outer side column 2*d* of the frame are constituted by welding or with fasteners, there are a multiple of through-holes 2*e* at many locations of the column, the frame is secured onto the center rotating body by means of fasteners; the center rotating body is tubular, the both ends are welded with solid shafts, the lower end shaft portion 1*a* is provided with the ball bearing 6 to be assembled on the installation frame N1, the shaft portion 1*a* can also have a brake 8, shaft portion 1*c* is provided with a clutch or coupling or gear; the upper end shaft portion 1*b* is provided with rolling bearing or ball bearing 6*a* to be assembled on the installation frame N2, the shaft portion 1*d* is connected with shaft portion 1*c* by means of clutch 7 or coupling.

At the location which is measured from the bottom in the height of the column 2*a* of frame portion and outer side column 2*d* in the vertical direction slightly above the midpoint or at any location away from the above mentioned location within certain distance, there are symmetric through-holes at the same level line. The wind pressure push mechanism 3 has support shaft 3*b* at same vertical height which has same level centerline and is provided with seat bearing 3*d* to be assembled in the above mentioned through-hole with bolts; each of one side of all outer side column 2*d* is provided with an adjustment device 2*f* for adjusting the opening degree of the wind pressure push mechanism, it may adjust the height by means of threads.

Figures 1, 3:
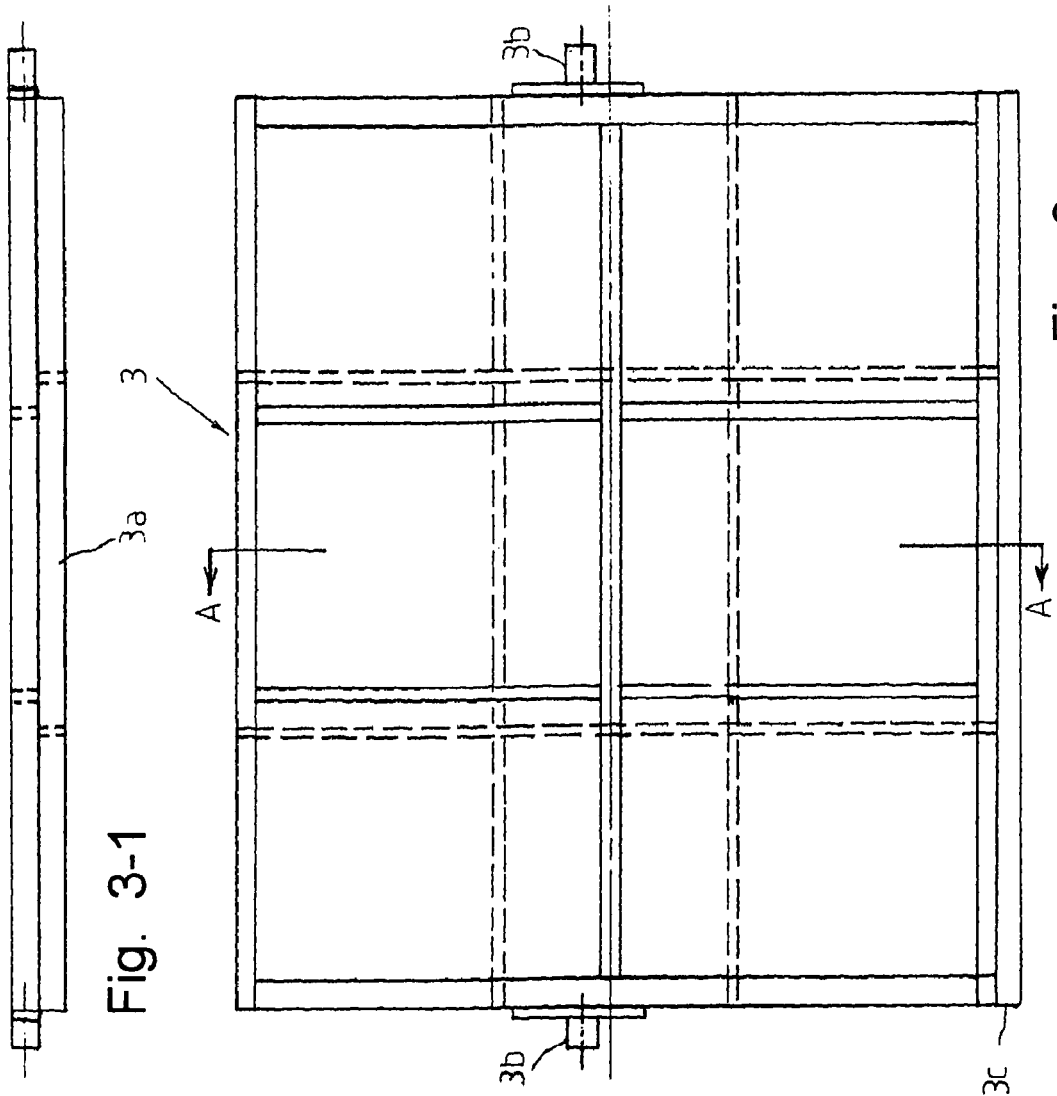
FIG. 3 is a front view of the wind pressure push mechanism 3 for the wind-energy power machine according to the present invention.
Figures 2, 3:
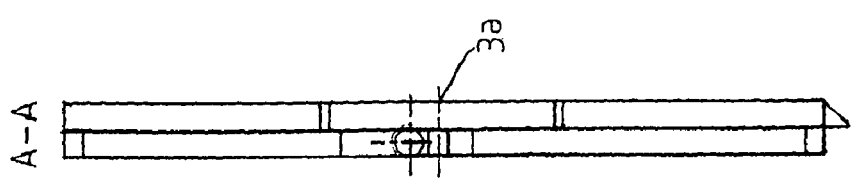

The constitution of the wind pressure push mechanism 3 is shown in the front view of FIG. 3, right side view of FIG. 3-1 and A-A section view of FIG. 3-2. The wind pressure push mechanism 3 has a frame, its side which receives the wind is a concave body 3*a* so that it can accumulate the wind energy to strengthen the push force, it may be made of metal or non-metal plate and is bent along the four sides with certain height and width to form a component with four sides which have definite height. The wind pressure push mechanism has a horizontal support shafts 3*b* being symmetric and at the same level centerline on two vertical outer side surfaces of the frame at the location which lies in the height of the outer side frame of the wind pressure push mechanism in the vertical direction slightly above the midpoint, or at any location away from the above mentioned location within a certain distance. The weight which forms the lower volume of the wind pressure push mechanism is slightly heavier than the upper portion, so that the wind pressure push mechanism can be raised to open when it is against the wind, even if under the action of gentle breeze and centrifugal force; its bottom has a positioning plate 3C, when it conforms to the wind direction, the wind pressure push mechanism homes to close under the action of lower weight and air stream, and the positioning plate presses against the lower cross beam 2*b*.

Figure 4:
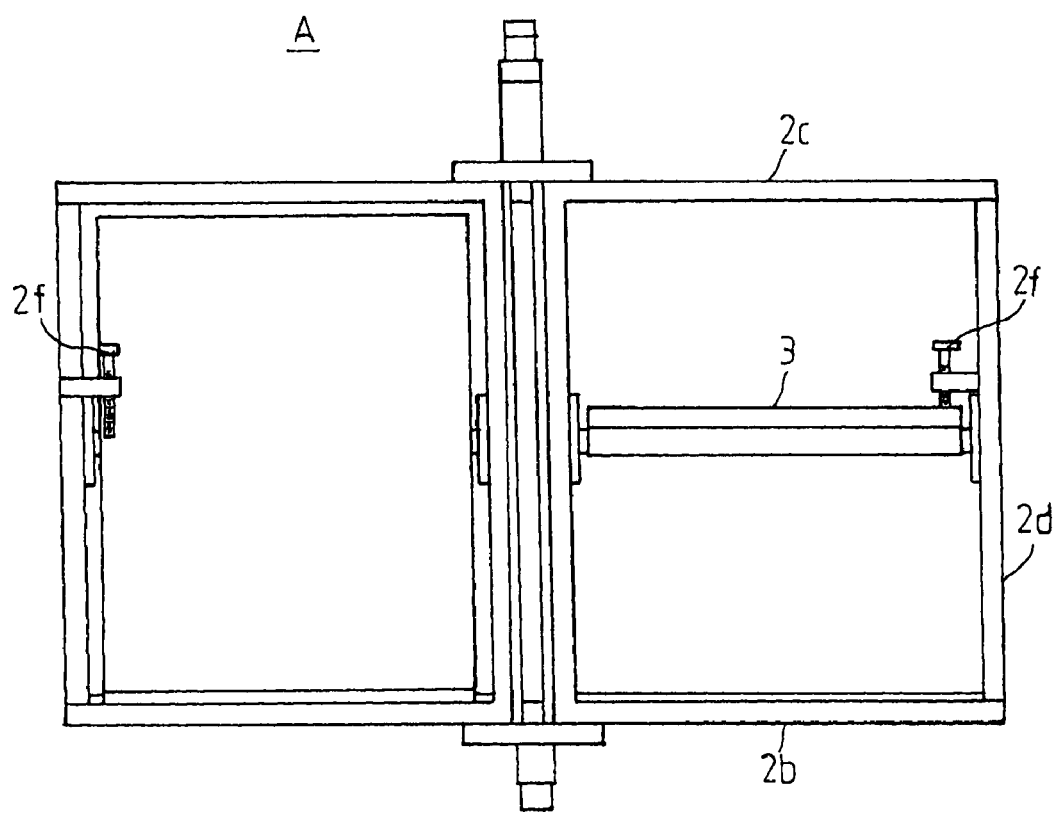
FIG. 4 is a front view of the wind-energy power machine according to the present invention showing the opening state when one side of the wind pressure push mechanism 3 is against the wind.
Figure 5:
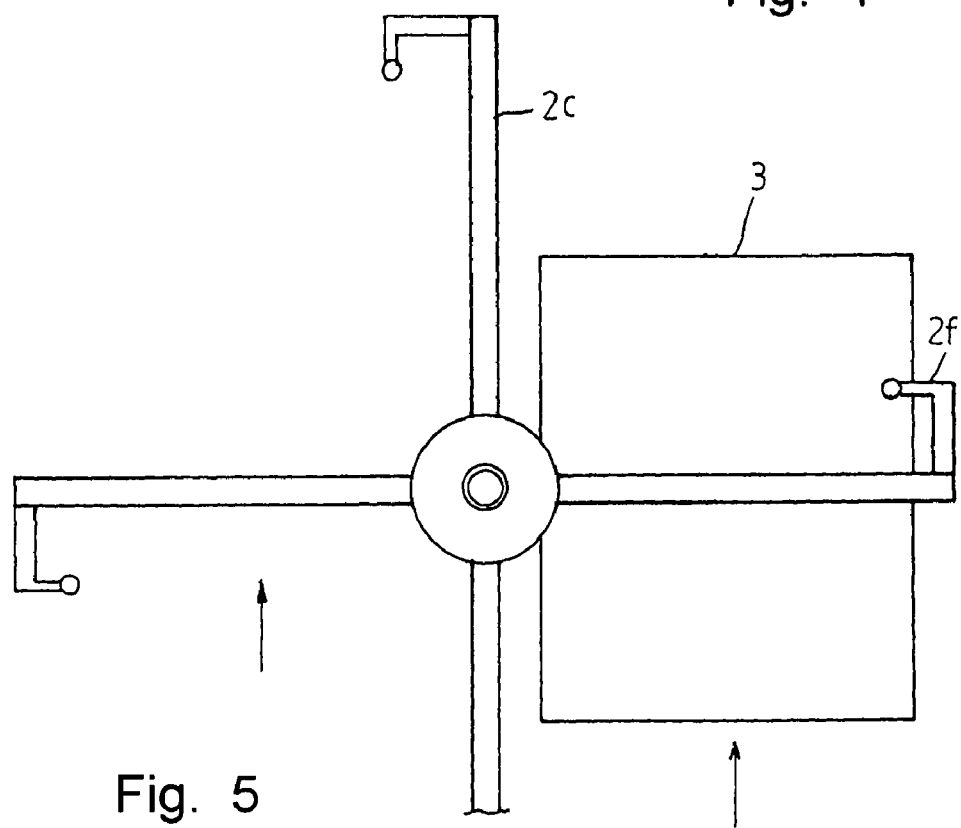
FIG. 5 is a top view of the wind-energy power machine according to the present invention showing the opening state when one side of the wind pressure push mechanism 3 is against the wind.

The front view of FIG. 4 and the top view of FIG. 5 schematically show the main constitution of the wind-energy power machines A, which has 4 set of frame 4 and 4 set of wind pressure push mechanism 3 and center rotating body 1, in which the wind pressure push mechanism on the right side against the wind has been opened, the adjustment device 2*f* restricts the open degree, and the arrow direction represents the air stream direction; the left side is in the wind received process in the wind direction, the wind pressure push mechanism presses against the lower cross beam to form a wind-driven state in the direction perpendicular to the wind direction. The frame portion and wind pressure push mechanism may have different quantity.

Figure 6:
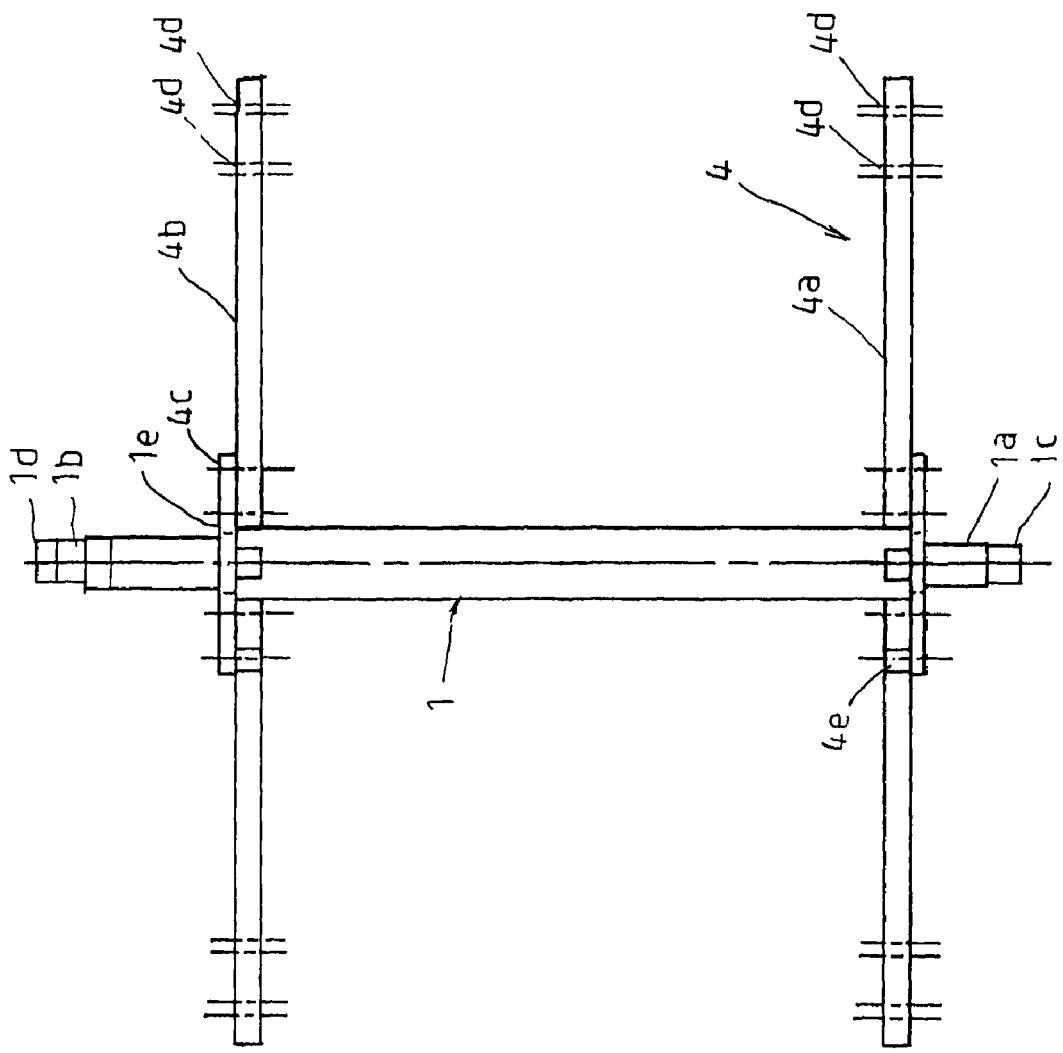
FIG. 6 is a front view of the wind-energy power machine according to the present invention showing another structure of frame 4 and center rotating body 1.

FIG. 6 shows another combination of different frame 4 and center rotating body 1 for the wind-energy power machines A according to the present invention, the lower cross beam 4*a* and the upper cross beam 4*b* of the frame portion are mounted on the fix plate 1C of the center rotating body 1 with bolts 4C; at the outer side end location which is away from the center rotating body a certain distance in the horizontal width direction, there is through-hole 4*d* with each symmetric mount seat bearing 5*d* and/or cam set 5*c* of the support shaft which has same vertical centerline; the frame portion and the wind pressure push mechanism may have many sets.

Figures 1, 7:
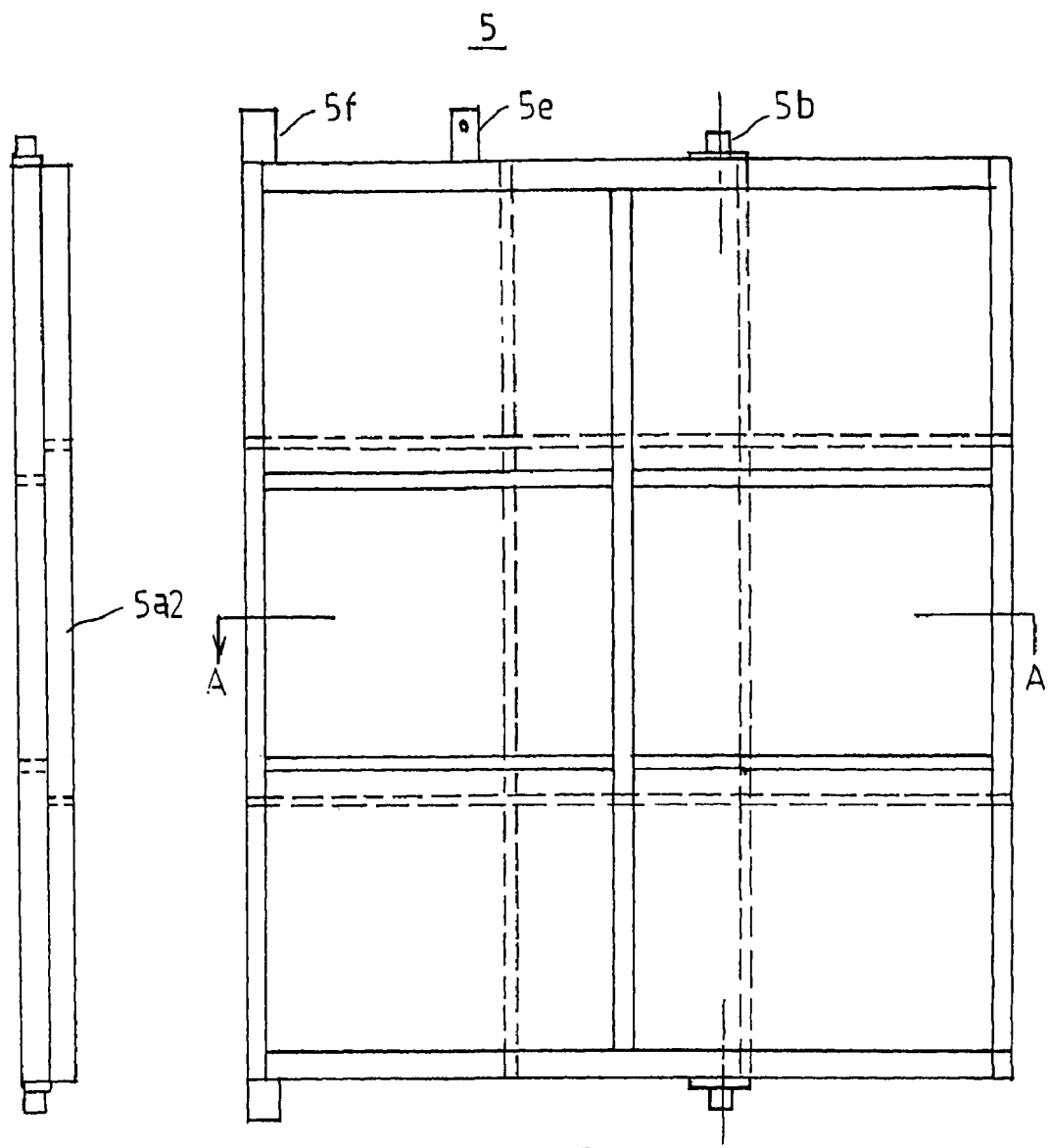
FIG. 7 is a front view of the wind pressure push mechanism 5 for the wind-energy power machine according to the present invention.
Figures 2, 7:
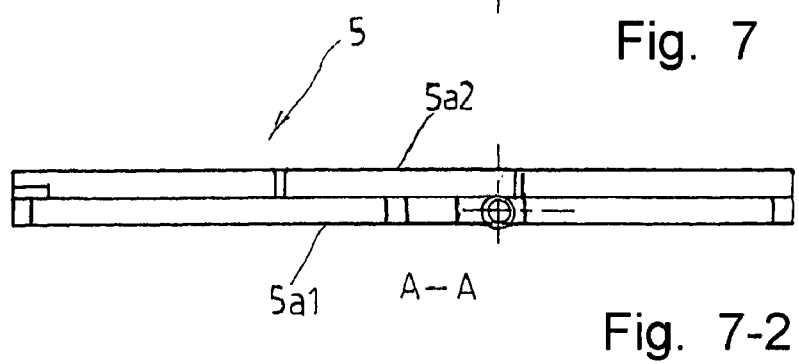

The front view of FIG. 7, the right side view of FIG. 7-1 and the A-A section view of FIG. 7-2 show the main structure of the wind pressure push mechanism 5 which fits to the frame 4, and the concave body 5*a* consists of frame 5*a*1 and concave plate 5*a*2, the concave plate may be a main plate with surroundings which are bent along the circumference of the plate in integrity to a definite height; within a certain range which is apart from the ⅔ width of the horizontal width of the upper and lower frame or at least ½ width a definite distance, there are support shaft 5*b* and support shaft cam set 5*c* (5*c*1, 5*c*2) with same vertical centerline, outside its wide side there is provided with the fix plate of wind pressure push mechanism which presses against the cross beam, between the upper frame positioning plate and the support shaft there is provided with a lug 5*e* which connects the link cord 5*g*3.

Figure 8:
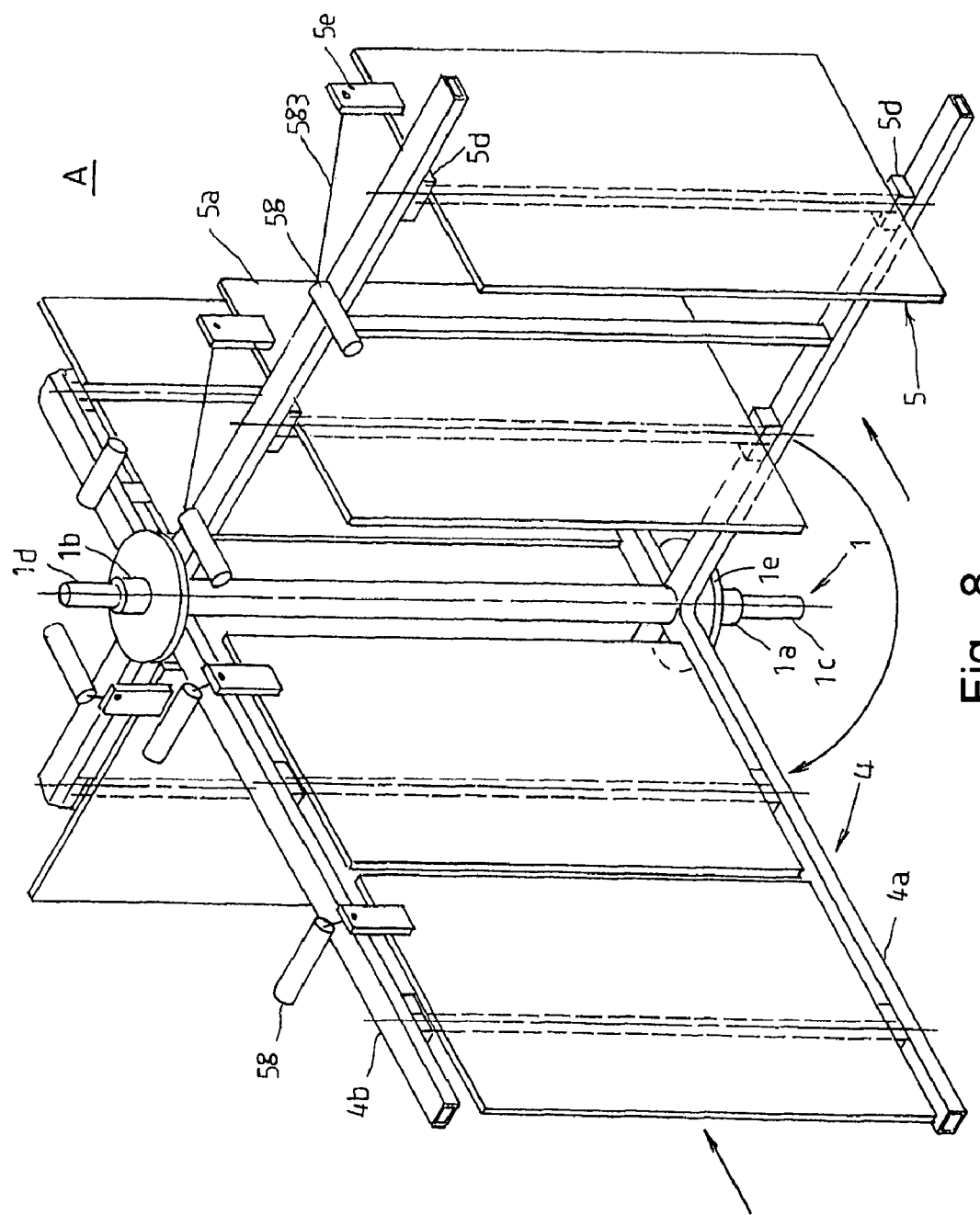
FIG. 8 is a perspective view of the frame 4 for wind-energy power machine according to the present invention, which has 4 set of frame portions and 8 set of wind pressure push mechanisms.

FIG. 8 shows the main constitution of a wind-energy power machines A, which has 4 set of frame portion 4 and 8 set of wind pressure push mechanism 5, the right part of the drawing shows the state of a set of wind pressure push mechanism, in which it has been opened so that the whole plane is parallel to the wind direction when it is against the wind, this forms a status without resistance against the wind, while the other 3 set of wind pressure push mechanism are all in the home and close position, one set of wind pressure push mechanism on the left side is in the process, in which it is against the wind facing the wind pressure to be driven, such that a wind-energy power machines A is formed that can receive wind energy in any direction to rotate. The straight arrow represents the wind direction, and the arc arrow represents the rotation direction of the wind-energy power machine.

Figure 10:
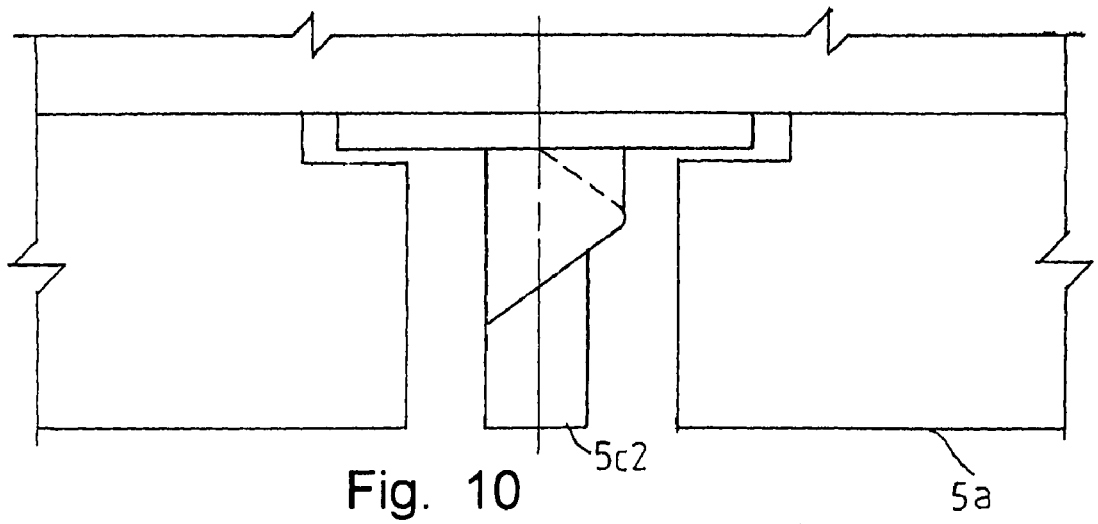
FIG. 10 is a front view of the male cam for the wind-energy power machine according to the present invention.
Figures 2, 9:
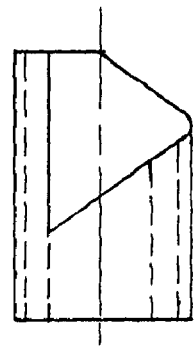
FIG. 9 is a front exploded view of the female cam of the wind pressure push mechanism for the wind-energy power machine according to the present invention.
Figure 9:
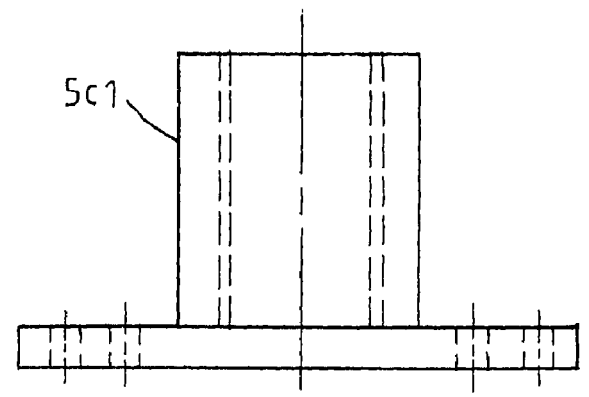
Figures 3, 9:
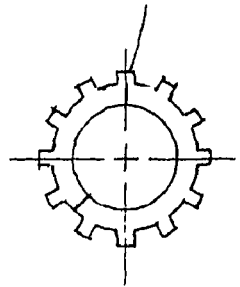
Figures 1, 9:
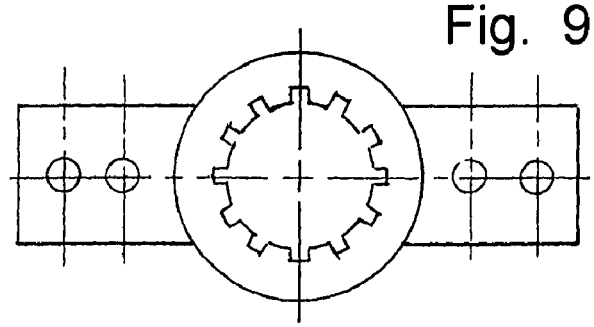

The upper cross beam is provided with centrifugal force balance homing device 5*g*, and the lug 5*e* for connecting the link cord 5*g*3; the upper support shaft 5*b* of the wind pressure push mechanism is mounted on the lower portion of the upper cross beam with the seat bearing 5*d*, and the support shaft cam set 5C may be referred to FIG. 9 and 10, FIG. 9, FIG. 9-1 is female cam 5*c*1, it has a inner sleeve 5C3 with male and female racks shown as the front view of FIG. 9-2 and the top view of FIG. 9-3, adjusting the angle of the male and female racks, the open degree of the wind pressure push mechanism can be adjusted; FIG. 10 shows the male cam 5*c*2, the match inclination therebetween is within 25 to 55 degree; the male cam is mounted on the base of the wind pressure push mechanism 5, and the female cam is mounted on the corresponding position of the lower cross beam installation through-hole 4*d*.

Figure 11:
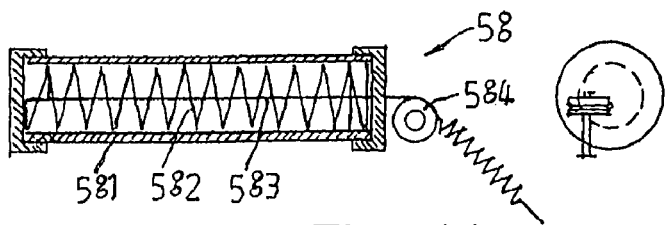
FIG. 11 is a front view of the centrifugal force balance homing device.

FIG. 11 briefly shows the constitution of the centrifugal force balance homing device 5*g*, a hollow cylinder 5*g*1, an inside compression spring 5*g*2, the flexible steel cable of link cord 5*g*3, which connects to the inside end of the compression spring on one end, the outside end of the cord hangs to the small ball 5*g*4 and connects to the tension spring and again connects to the lug.

Figure 12:
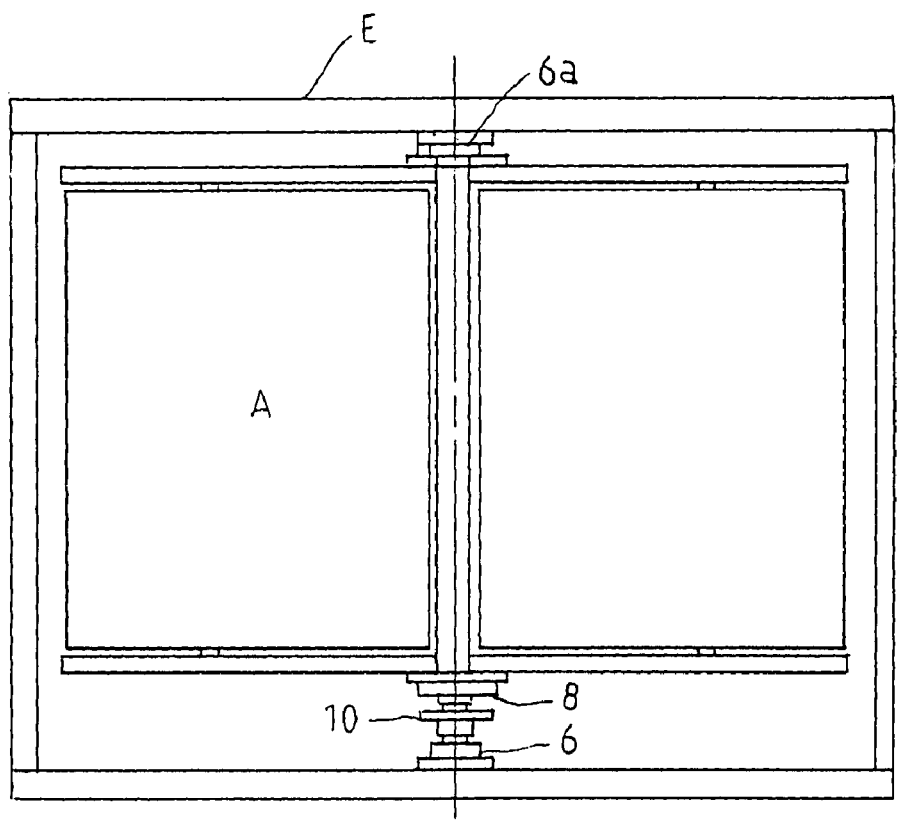
FIG. 12 is a schematic view of the wind-energy power machine according to the present invention mounted on an independent machine frame.
Figure 13:
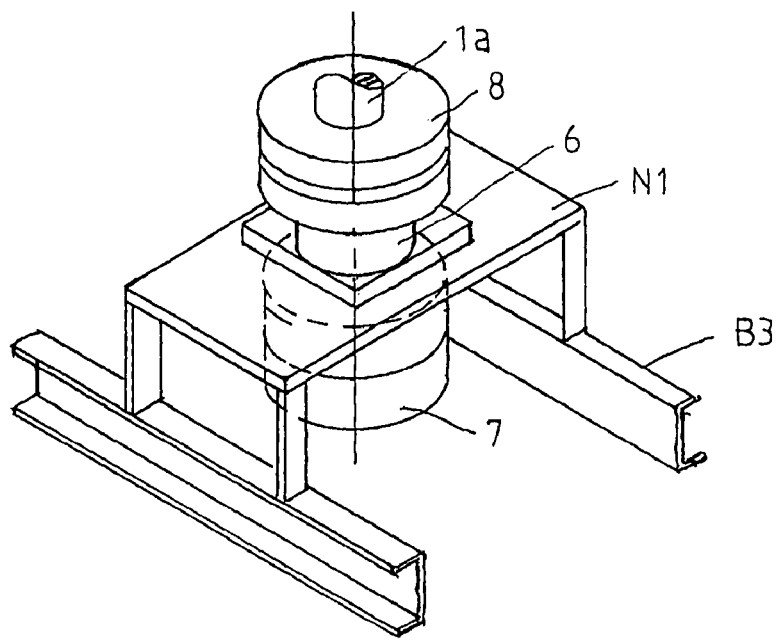
FIG. 13 is a perspective view showing the installation of shaft of the center rotating body and seat bearing mounted on the installation frame N1 and clutch.

FIG. 12 shows a wind-energy power machines A mounted on the independent machine frame E, the upper portion of the center rotating body 1 is mounted on the upper beam with ball bearing 6*a*, the lower end shaft portion 1*a* is mounted on the lower beam with roller bearing 6, and the shaft portion is also provided with brake 8 and gear 10. The perspective view of FIG. 13 shows that the lower end shaft portion 1*a* of the center rotating body 1 is provided with brake and bearing 6, and the shaft portion 1*c* is provided with clutch 7, when shaft portion 1*c* and shaft portion 1*d* abut together, the shaft portion 1*c* is then provided with clutch 7, the bearing 6 is mounted on the installation frame N1, and the installation frame is secured to the cross beam B3.

Figure 14:
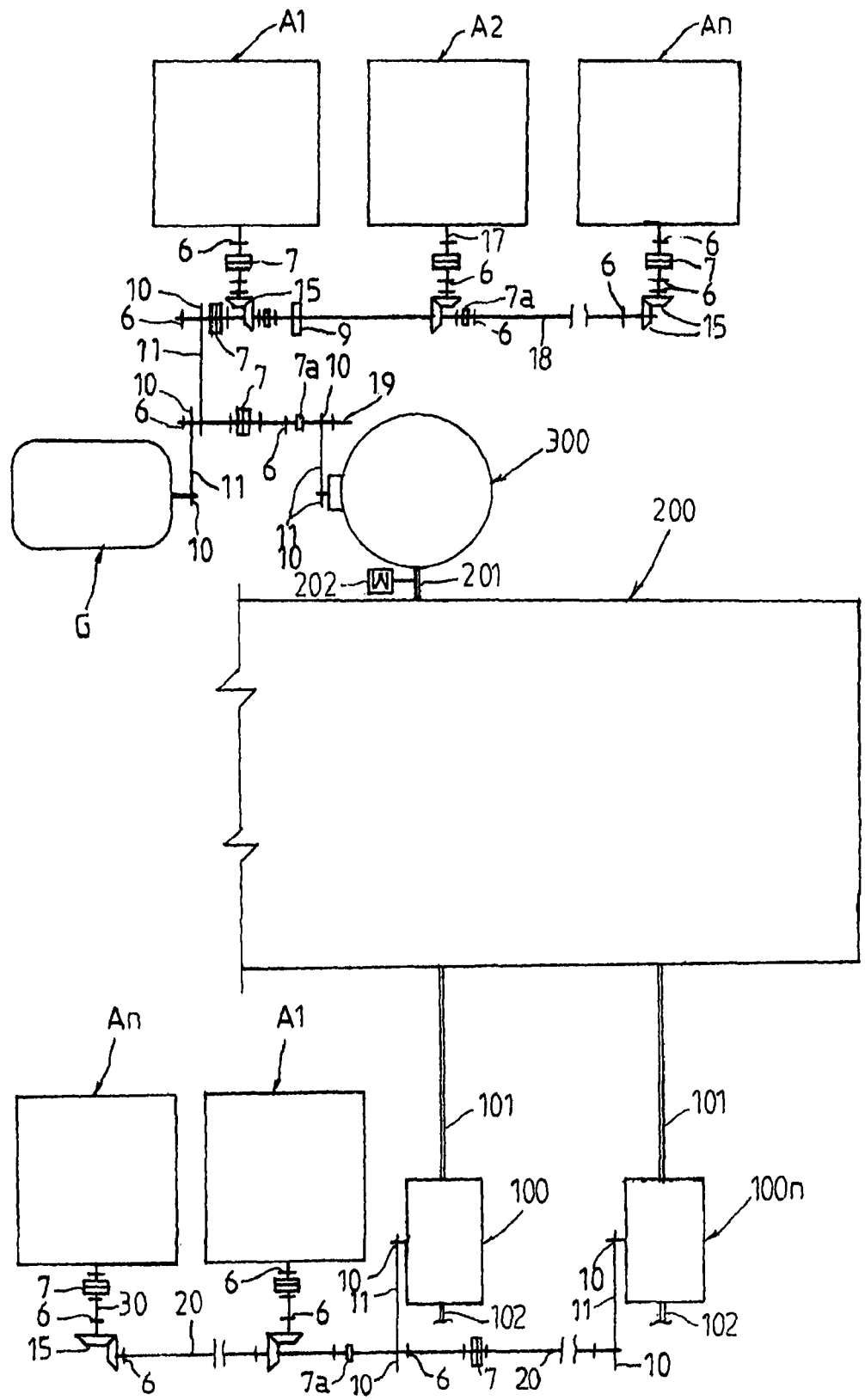
FIG. 14 is a schematic view of another embodiment of the storage energy power system according to the present invention.

FIG. 14 is the schematic plane view of one embodiment of the energy storage power generating system, the upper part of the drawing is the motor unit series as main power source which constantly rotates when there is wind, they include at least one to a multiple of wind-energy power machines A:A1, A2 . . . An, each transmits the power through power output shaft 17, clutch 7, bevel gear 15 to the first common transmission shaft 18, the first common transmission shaft consists of several shafts which are connected with coupling 7*a*, and is mounted on the cross beam B2 or B3 with seat bearing 6 and support member, this transmission shaft is also provided with constant speed controller 9, and the power output end is provided with clutch 7, sprocket 10 of the transmission member, chain 11, the power is then transmitted to the second common transmission shaft 19, the common transmission member drives the generator G to generate electricity, or through the integration of vertical connection and parallel connection combined system the generator is driven to generate electricity.

Regarding to the series of the motor unit as the standby power source, at least one to a multiple of wind-energy power machines A:A1,A2 . . . An transmit the power through the power output shaft 17 which connects the respective wind-energy power machine to the common transmission shaft 20, then the transmission members 10,11 drive the fluid pump 100 to rotate and do work; power output shaft 17 is mounted on the floor beam through the support member with the seat bearing 6, this power output shaft is provided with a clutch 7 so that it can be disconnected or transmit the power; the fluid pump draws water through an inlet pipe 102 from the lower reservoir to the upper reservoir 200, the outlet pipe 101 is connected with a solenoid valve 202; when the natural wind blows weakly and the speed of the motor unit as main power source or the power output or the generator power is lower than a predetermined value, the automatic controller system sends a command to disconnect the clutch of the first common transmission shaft, at the same time the solenoid valve 202 automatically opens, the water from the upper reservoir drives the water-wheel machine 300 and outputs the power through the transmission members 10,11 and the second common transmission shaft 19 and the closed clutch 7 and the common transmission member 10,11, so as to drive the generator in operation and generate electricity.

In the practical application, the fluid pump is provided on the upper reservoir, in this case the flexible connection for the high pressure driven fluid pump is preferable, in this way the problem of long distance power transmission for the wind-energy power machine is well solved. The present application is well suitable for the geographical environment where there is no much water resources but there is water potential difference between upper and lower reservoir, this can be combined with wind energy and fluid energy to build all-weather power plant.

Figure 15:
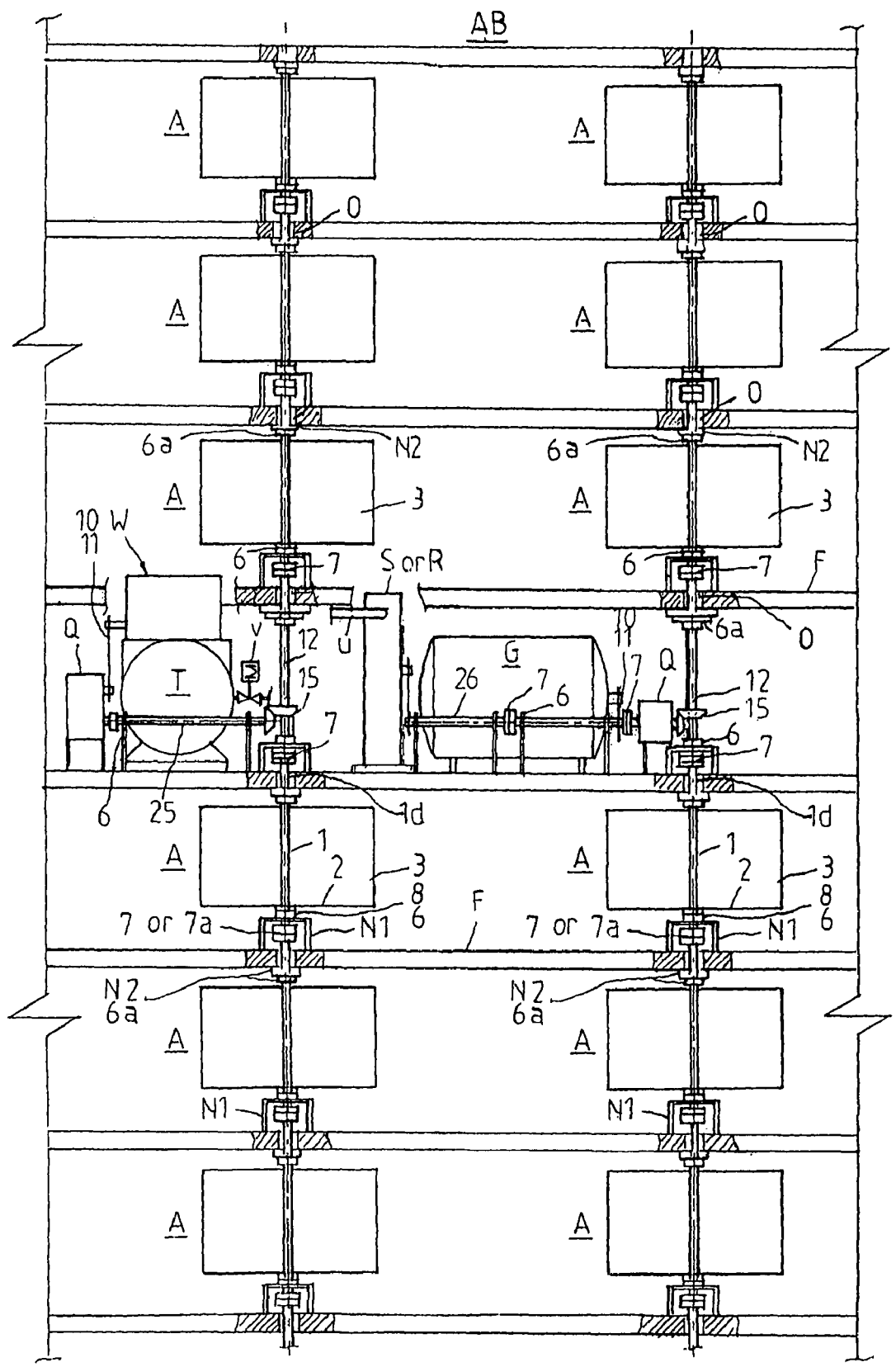
FIG. 15 is a front view of the storage energy power system according to the present invention, which integrates a combination system of vertical connection in series and parallel connection.

FIG. 15 is a front view of a combined system AB which integrates the vertical series connection and parallel connection, this is another embodiment of the energy storage power generating system. The integration number and constitution of the wind-energy power machine A of the motor unit as main power source are same as those of the motor unit as standby power source, the number of wind-energy power machine mainly depends on the power demand scale. The present embodiment only shows a type example of 7-storied construction which utilizes a high frame, the same module can be arranged on the floors of the high frame structure B, this can easily and flexibly expand the scale of the power and generator set; the wind-energy power machine A of the present invention is characterized in that it can be developed towards the high space.

The center rotating bodies 1 of wind-energy power machines arranged on the upper and lower three floors and the installation windows O are aligned in the same vertical centerline, the shaft portion of the center rotating body of each wind-energy power machine is fitted with a bearing 6, 6a and vertically mounted on the installation frames N2, N1; shaft portions 1c, 1d are connected each other with a coupling 7a or clutch 7, and a generator G, an air compressor W, a cylinder T and a turbine S etc. are installed on the middle floor, the wind-energy power machines on the both of upper and lower floors adjacent to the middle floor serve as the terminal power output, their center rotating bodies are fitted with clutches and connected separately with first transmission shaft 12, the motor unit as main power source drives the generator to generate electricity through the first transmission shaft and the gear and the reduction gearbox Q and then through the connected power output shaft 26, the clutch 7 and the common transmission member.

The constitution of the motor unit as standby power source is same as that of the motor unit as main power source, the power drives the air compressor W through the first transmission shaft 12 and the transmission shaft 25 and the reduction gearbox Q and the transmission member 10,11, the pressurized air accumulates in the storage container T, and the container T and turbine S are connected with solenoid valve through pipe U; the power from turbine or pneumatic motor drives the generator in operation to generate electricity through transmission shaft 26, clutch 7, common transmission member 10,11.

The both motor units as main power source and as standby power source can control and select the time of alternately in operation or stopping power output by means of an automatic controller system, the motor unit as main power source operates to provide power to drive the generator in operation for generating electricity when there is wind energy, but the motor unit as standby power source and the air compressor are also in operation to do work and accumulate high pressure air in the storage container, however, the turbine or the pneumatic motor is in the shutdown state; it is only when the wind is so weak that the speed or power of the motor unit as main power source or the electricity output of the generator is lower than a predetermined value that the motor unit as standby power source then outputs the power; when the automatic control circuit detects that the generator or the motor unit as main power source operates in disorder until under the predetermined value, then the solenoid valve is to open, at the same time the clutch on the first common transmission shaft end disconnects, and the turbine or the pneumatic motor begins to operate, while the clutch on the transmission shaft 26 automatically closes, the output power drives the generator to continue in normal operation generating electricity. The power transmission form here described is only a preferable example, obviously, it is possible that there is other suitable transmission form.

Figure 16:
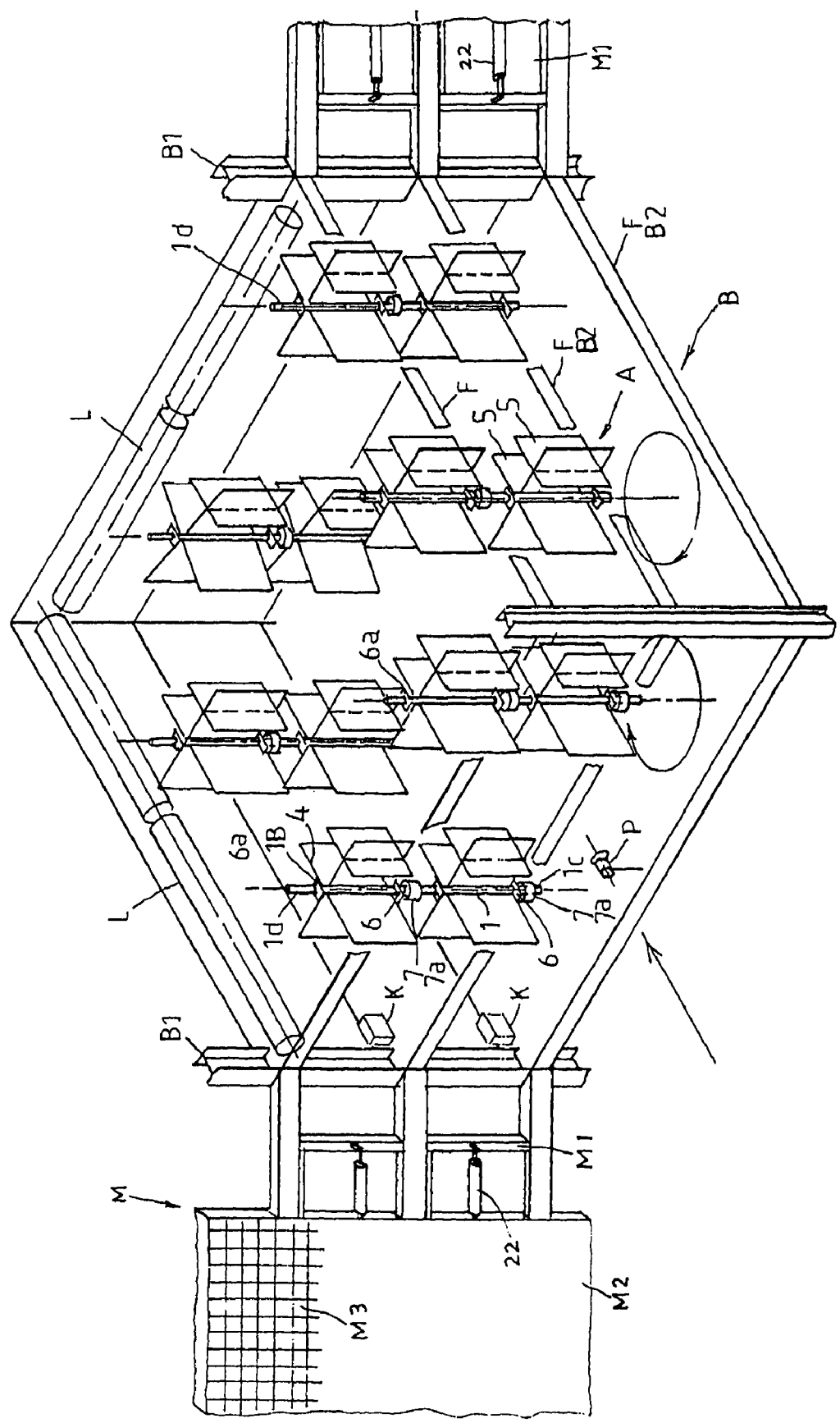
FIG. 16 is a perspective view showing the wind-driven power generating system according to the present invention.

FIG. 16 shows the constitution of the wind energy power generating system according to the present invention, and shows the high frame structure B with wind-energy power machines A locally arranged on the two-storied frame; a certain quantity of wind-energy power machines are installed in the specially opened large scale high frame structure B which is constructed to sufficiently utilize the high space, in the way that utilizes the vertical integration system C or the horizontal integration system or the both, such that one or several large scale power generating units are formed and output electric power, again individual large scale power generating unit is combined with transformer station to constitute a larger scale power generating system with capacity of hundreds or thousands MW.

The described large scale high frame structure B is a specially designed frame, it may be steel structure or steel reinforced concrete structure; the described high structure may be tens meters or more to hundreds or thousands meters high. There is an impermeable wind collection wall which integrally extends in a certain length in the southeast, northeast, northwest and southwest direction of the frame structure, the wall body only on the side near a column B1 of the frame structure has a window M1 which can be opened and closed by a pneumatic cylinder or a electrical controller and which is at same level as each floor, the wind collection wall M2 with large area and the top platform of the frame structure are provided with a power generating device M3 with a large quantity of photoelectric tubes which transform light to electricity, the generated electricity can be incorporated to the power supply network of the present system. Each floor of the frame structure has not fixed shield wall body in the four sides, but there is a pneumatic or electric rolling door L to prevent from the storm invading or when shutdown due to some factors; every several floors is provided with a wind anemometer P in the southeast and northwest direction, there is also provided with control-box K of the automatic controller system on every floor, all the windows and rolling doors can be controlled to certain degree through automatic control system to control the wind-energy power machine kept operating within the permissible changeable range of the predetermined value.

The straight arrow in the Figure represents the wind direction, and the arc arrow represents the rotation direction of the wind-energy power machine A; the drawing shows the state in which the right wind pressure push mechanisms 5 of all wind-energy power machines automatically open and are parallel to the wind direction, while the other 3 sets of the wind pressure push mechanisms are in the close state. In the Fig., the wind collection wall M is only the exemplary, all the wall bodies M2 can be arranged with photoelectric power generating device M3 from top to bottom; the movable window M1 is between the wall body and the column B1, the cylinder 22 of the close and open device is provided in the middle location.

Figure 17:
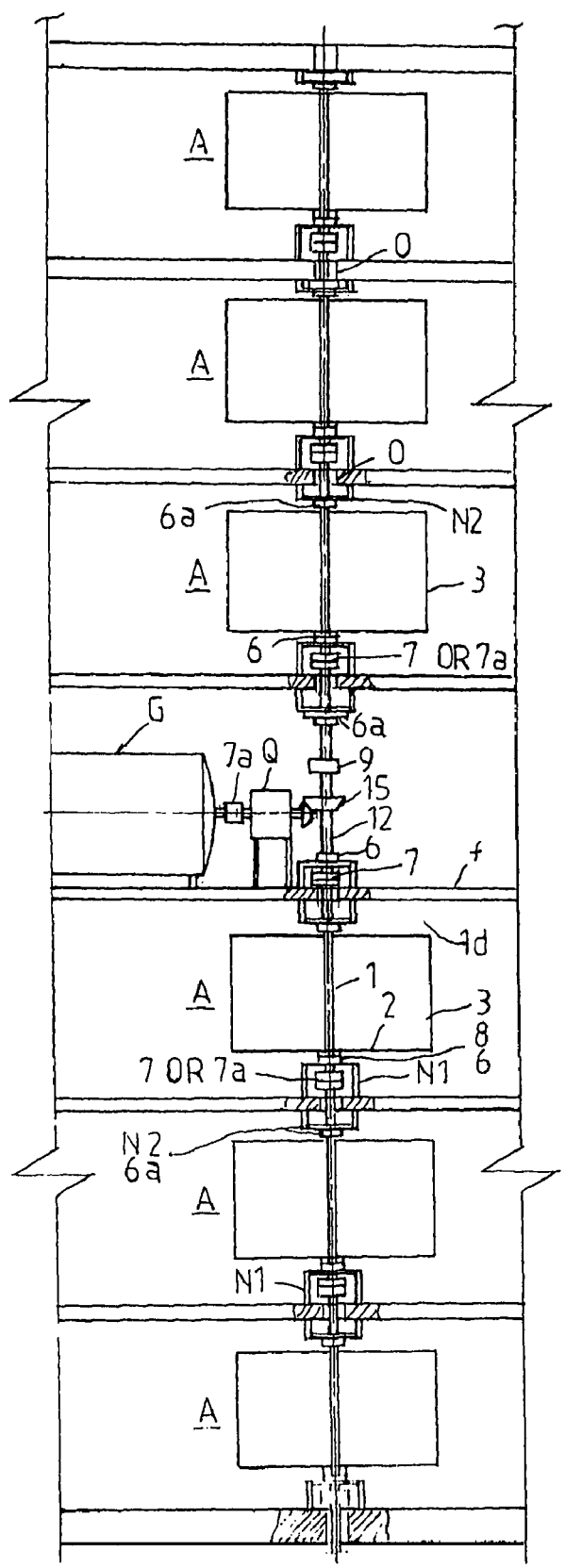
FIG. 17 is a front view of the vertical integration system for the wind-driven power generating system according to the present invention.

FIG. 17 shows the vertical integration system C, the generator G is installed on the middle floor, a multiple of wind-energy power machines A which are in the same vertical centerline are provided on the upper and lower several floors, respectively, the respective center rotating bodies 1 are serially connected with the couplings or the clutchs, the shaft portion of the wind-energy power machine as the terminal power output is connected with the first transmission shaft 12 by the clutch 7, the coupling 7a transmits the power through the gear 15 and the reduction gearbox Q to the generator to drive it in operation for generating electricity. The upper shaft portion 1b of the center rotating body 1 for the wind-energy power machine is provided with the ball bearing 6a, the lower shaft portion is provided with the roller bearing 6 in order to install the wind-energy power machine vertically on the installation frame N2 and N1.

Only one representative vertical integration system is shown in the Figure, with respect to the special large scale high frame structure B, a multiple of vertical integration systems C or integrated combination systems of series connection and parallel connection can be arranged in the vertical direction and/or horizontal direction.

Figure 18:
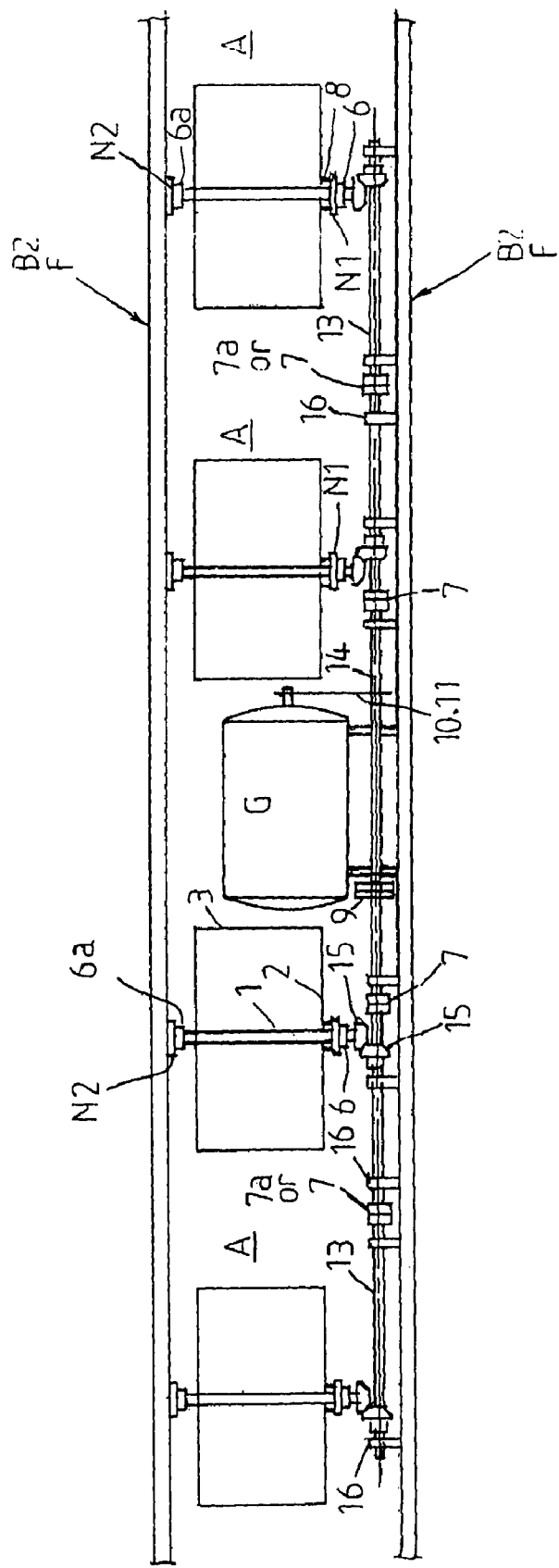
FIG. 18 is a front view of the horizontal integration system for the wind-driven power generating system according to the present invention.

FIG. 18 schematically shows the constitution of the horizontal integration system D arranged on certain floor of the high frame structure B, its upper or lower floor may have a pluarality of horizontal integration systems to form a grouped large scale power generating system. As shown in the Fig., In the left and right space there are provided with several wind-energy power machines A, the generator G is installed in the middle region; wind-energy power machines are vertically installed on each respective installation frame N1, N2 with the bearings 6, 6a mounted on the shaft portions of the center rotating body; the installation frame N1 is provided on the floor cross beam B2 with a certain height, the lower portion forms a space which receives gear 15; in the left and right region there is provided with a horizontal transmission shaft 13 connected with clutch 7 or coupling 6a, the bevel gear thereon is engaged with the bevel gear 15 on the lower end shaft portion of the respective wind-energy power machine; the power output ends of the both horizontal transmission shaft are provided with the clutch 7 connected with the horizontal common transmission shaft 14, and can connect the generator through the chain and sprocket, and the shaft 14 may also have constant speed controller 9.

In addition, all wind-energy power machine A can also transmit power through a front transmission shaft provided with the clutch, the gear on the shaft end is engaged with the gear on the center rotating body shaft portion 1c of the wind-energy power machine, the gear on the other shaft end is engaged with the gear on the horizontal transmission shaft 13, each wind-energy power machine can output or disconnect the power through the clutch provided on this transmission shaft.

Figure 19:
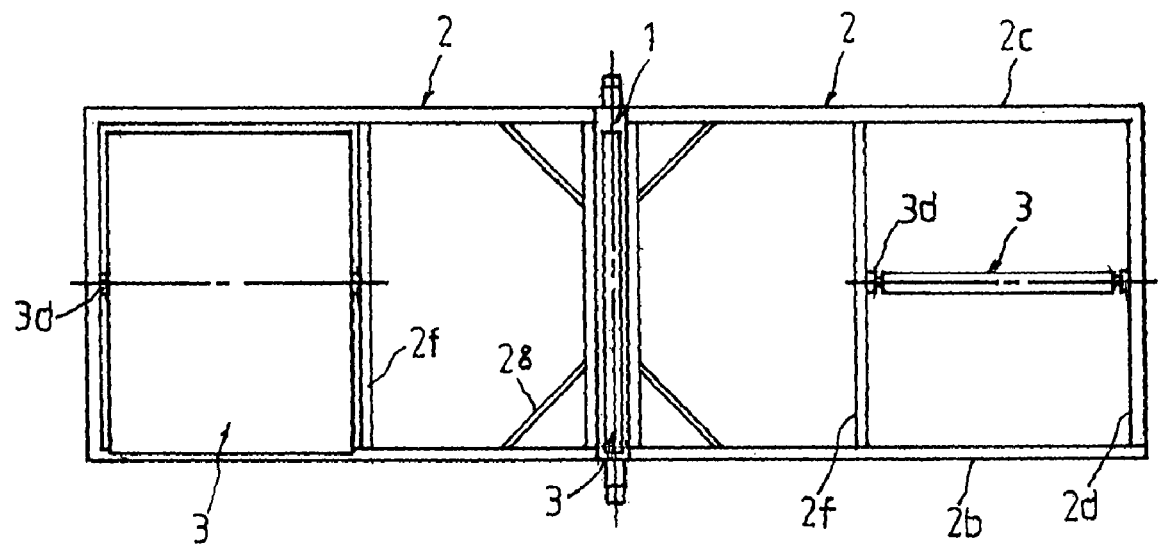
FIG. 19 is another view of the frame portion of the present invention.

The constitution of the frame portion and the installation way of the wind pressure push mechanism may be variably changed, FIG. 19 shows another constitution of the frame portion 2, the wind pressure push mechanism 3 is mounted on the outer side column 2d and inner side column 2f which is away from the center rotating body 1 a certain distance to form a larger leverage so that the wind pressure push mechanism can receive increased driving force generated by the wind. The right part of the Figure shows the process of the wind pressure push mechanism against the wind which is opened to form the whole surface almost in the state parallel to the wind direction, while the left part of the Figure shows the process of a free wind in which the wind pressure push mechanism closes and presses against the upper and lower cross beams and forms the whole surface almost in the state perpendicular to the wind direction.

Figure 20:
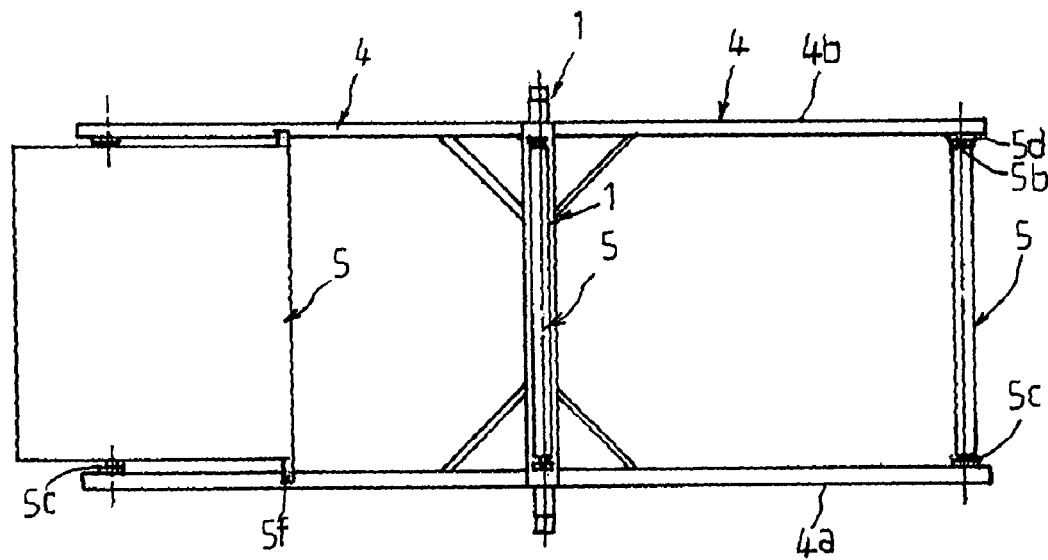
FIG. 20 is another vertical view of the frame portion of the present invention.

FIG. 20 schematically shows the wind pressure push mechanism 5 which is vertically installed on the same vertical centerline between the upper cross beam 4b and the lower cross beam 4a away from the center rotating body 1 with a certain distance; the right part of the Figure shows the state of the wind pressure push mechanism against the wind which is opened to form the whole surface in the state parallel to the wind direction, while the left part of the Figure shows the state of a free wind in which the wind pressure push mechanism closes and receives the wind force to be driven.

What is claimed is:

1. An energy storage power generating system comprising two series of motor units and their equipments for using the energy, one of the motor units is the main power source which constantly rotates when there is wind, which includes at least one to a multiple of wind-energy power machines which drive a generator in operation to generate electricity, or which transmits the power through a power output shaft, a clutch, a gear which connects a power output end gear of the respective wind-energy power machine to a first common transmission shaft provided with a constant speed controller, the power is then through a transmission member transmitted to a second common transmission shaft which is shared by the standby power source, and the common transmission member drives the generator to generate electricity, or the generator is driven to generate electricity through the integration of vertical series connection and parallel connection combined system;

the other series of the motor unit is a standby power source, which includes at least one to a multiple of wind-energy power machines, at least one to a multiple of air compressor which generate high pressurized air, and sufficient containers which accumulate pressurized air and at least a turbine which uses the pressurized air to generate rotation power or a pneumatic motor or a fluid pump, and a high pressure air piping and a solenoid valve as well as sub-containers provided on each floor; the at least one to a multiple of wind-energy power machines drive the air compressor to do work, or through the power output shaft, a clutch, a bevel gear which connect the respective wind-energy power machine the power is transmitted to a common transmission shaft, a transmission member or a reduction gearbox drives the air compressor to do work, or through the integration of vertical series connection and parallel connection combined system the power is transmitted to drive the air compressor in operation, the generated pressurized air is accumulated in the container; the connection piping between the container of the air compressor and the next container is provided with a check valve, the solenoid valve and the throttle valve are provided in the piping between the container and the turbine or the pneumatic motor or the fluid pump; the turbine and the pneumatic motor are driven in operation by the pressurized air supplied by the container, and through a second common transmission shaft, clutch and a common transmission member the generator is driven to generate electricity;

the motor units as the main power source and as the standby power source are selected by means of an automatic controller system which controls the time to alternately operate the motor unit, its controlling mode or program is as follows, when there is natural wind, the both wind-energy power machine units and air compressor set or the fluid pump operate simultaneously to do work, but the turbine or the pneumatic motor or the water-wheel machine is in the shutdown state, the clutch on the second common transmission shaft is disconnected, the motor unit as the main power source drives the generator in operation to generate electricity;

when the natural wind blows so weakly that the speed of the motor unit as main power source or the power output or the generator power is lower than a predetermined value, the automatic controller system sends a command to let the clutch of the first common transmission shaft disconnect, at the same time the solenoid valve automatically opens, the throttle valve controls the flow rate of the pressurized air in the container, the pressurized air is inputted into the turbine or the pneumatic motor and the rotation power is generated, the clutch of the second common transmission is automatically closed, the output power drives the generator to generate electricity, or it controls and drives the water-wheel machine and power generating unit to generate electricity.

2. The energy storage power generating system according to claim 1, wherein the above described containers are provided piping connected with a sub-container on each floor, the sub-container supplies the pressurized air through a solenoid valve, a piping to the cylinder or the pneumatic motor or a pneumatic clutch of the rolling door;

the power output shaft and the common transmission shaft is provided with a support seat bearing and a clutch at necessary locations thereof, in addition the common transmission shaft is still provided with a coupling at necessary location.

3. The energy storage power generating system according to claim 1, wherein the motor unit as standby power source for the energy storage power generating system includes at least one to a multiple of wind-energy power machines, at least one fluid pump, one upper reservoir and one lower reservoir and water-wheel machine; the wind-energy power machine drives the fluid pump in operation to do work, or through the power transmission shaft, the clutch, the bevel gear which connects the respective wind-energy power machine the power is transmitted to the common transmission shaft with the coupling supported by a bracket and a seat bearing, a transmission member drives the fluid pump in operation, the water is drawn to the upper reservoir through an input piping and an output piping connected with the lower reservoir, and then through the piping, a connected solenoid valve and the throttle valve the water controls and drives the water-wheel machine in operation to output the power in order to drive the generator in operation to generate electricity.

4. The energy storage power generating system according to claim 1, wherein the integration of vertical series connection and parallel connection combined system constitutes as follows: a multiple of wind-energy power machines of the motor unit as the main power source being installed on each floor of the high frame structure respectively in aligned with each other in the same common vertical axis and vertically installed on the installation frame with a bearing, the air compressor, the container, the turbine or the pneumatic motor and the generator being installed on one of the floors, hence there are both upper and lower motor units, or the wind-energy power machines in series connection on several upper or lower floors constitutes one motor unit, each wind-energy power machine of each unit is connected with the clutch or the coupling, while the wind-energy power machine of the power output end of the motor unit needs in connection with the clutch and the first transmission shaft; the motor unit as the standby power source may constitute in the same way;

the motor unit as the main power source transmits the power through the first transmission shaft, the bevel gear or gear and the connected reduction gearbox, clutch and the common transmission member to drive the generator in operation to generate electricity; the motor unit as the standby power source transmits the power through the bevel gear or gear of the first transmission shaft, a transmission shaft, the reduction gearbox and the common transmission member to drive the air compressor to do work, the pressurized air is accumulated in the containers; when the speed or the output power of the motor unit as the main power source or generator is lower than a predetermined value or the generator doesn't do work, the automatic controller system controls the clutch on the unit end to be disconnected, the solenoid valve and the throttle valve in the piping connected with container and turbine automatically open, the pressurized air enters through the piping into the turbine or the pneumatic motor, they output the rotation power through the transmission shaft, the common transmission member to drive the generator in operation to generate electricity.

5. An energy storage power generating system comprising an automatic control system, at least one to a multiple of wind-energy power machines, at least one to a multiple of air compressors, a multiple of pressurized air containers, at least one turbine or a pneumatic motor or a fluid pump and a water-wheel machine, a pressurized air piping, a solenoid valve and a throttle valve and a generator; the at least one or a multiple of wind-energy power machines drive the air compressor to do work, or the power is transmitted to a common transmission shaft through a power output shaft which connects the wind-energy power machine, a clutch, a bevel gear, transmission member or reduction gearbox to drive the air compressor in operation, or through the integration of vertical series connection and parallel connection combined system the power is transmitted to drive the air compressor in operation, and the generated pressurized air is accumulated in the container; a connection piping between the container of the air compressor and the next container is provided with a check valve, the solenoid valve and the throttle valve are provided in the piping between the container and the turbine or the pneumatic motor or the fluid pump; the turbine or the pneumatic motor are driven in operation by the pressurized air supplied by the container and the generator is driven to generate electricity through a second common transmission shaft, a clutch and a common transmission member;

according to the output strength of the wind-energy power machine or the speed change which is set by the system the standard value is compared, the automatic control system estimates, controls and selects the required rotation of the matched air compressor, and optimizes the operation efficiency; the automatic control system also controls the opening and closing of the solenoid valve and operates the throttle valve so that it controls the output power of the turbine or the pneumatic motor or the fluid pump and the operation of the clutch;

the motor units function as a main power source and as a standby power source and are selected by means of an automatic controller system which controls the time to alternately operate the motor unit, its controlling mode or program is as follows, when there is natural wind, the both wind-energy power machine units and air compressor set or the fluid pump operate simultaneously to do work, but the turbine or the pneumatic motor or the water-wheel machine is in the shutdown state, a clutch on a second common transmission shaft is disconnected, the motor unit as the main power source drives the generator in operation to generate electricity;

when the natural wind blows so weakly that the speed of the motor unit as main power source or the power output or the generator power is lower than a predetermined value, the automatic controller system sends a command to let a clutch of a first common transmission shaft disconnect, at the same time the solenoid valve automatically opens, the throttle valve controls the flow rate of the pressurized air in the container, the pressurized air is inputted into the turbine or the pneumatic motor and the rotation power is generated, the clutch of the second common transmission is automatically closed, the output power drives the generator to generate electricity, or it controls and drives the water-wheel machine and power generating unit to generate electricity.

6. The energy storage power generating system according to claim 5, wherein the containers are provided a with piping connected with subsidiary container on each floors, the pressurized air is supplied through solenoid valve, a piping to a cylinder and pneumatic motor or a pneumatic clutch for the rolling door; the power output shaft, and the common transmission shaft have support component with seat bearing and the clutch on necessary locations, the common transmission shaft is also provided with the coupling on the necessary location.

7. An wind-driven power generating system comprising a multiple of wind-energy power machines and generators constitute a multiple of generator units, or certain quantity of wind-energy power machines are provided on a large special open high level frame structure through a vertical integration system or a horizontal integration system or the combination of the vertical and horizontal integration systems, which constructs a motor unit with larger power, and further connected with a generator to become a large scale power generating unit, it is also possible to arrange a plurality of large scale power generating units and output electricity respectively, or the combination of the respective large scale power generating units and transformer, distribution and power supply installations can constitute a larger scale power generating system;

the floor height, total height and the area of the high frame structure can be designed and planned according to the demand of power and scale, there is a partitioned floor between two stories, but there is no fixed wall body in the surroundings, however, there is a shield such as a movable rolling door which is activated pneumatically or electrically, and the shield is used to block off the wind from all direction when there is storm or when the equipment needs to be maintained;

there is an impermeable wind collection wall which integrally extends in a certain length in the southeast, northeast, northwest and southwest direction of the frame structure, the wall body only on the side near a column of the frame structure has a movable window which can be opened and closed by a pneumatic cylinder or electrical windlass and which is at same level as each floor; the wind collection wall and the top platform of the frame structure are provided with a power generating device with a large quantity of photoelectric tubes, the generated electricity can be incorporated to the power supply network of the present system; the frame structure has lift inside;

frame structure has installation frames for mounting the wind-energy power machines in the locations where the wind-energy power machines are installed in the inside space of each floor, each center rotating body of the wind-energy power machine in this location on each floor lies in a same vertical centerline, there is an installation window in the respective floor so that each wind-energy power machine which aligns with each other on each floor can be connected with a clutch or a coupling;

according to the rotation speed range of the wind-energy power machine, an automatic control system or a anemometer provided outside the frame structure detects the wind strength and outputs signals to the control system to automatically control the pneumatically or electrically activated rolling door and the open degree of the wind collection window, so as to control and adjust the override wind which surpasses a predetermined value within the defined range, so that the wind-energy power machine can steadily and credibly rotate to provide power; fully closing the rolling door enables all the wind-energy power machines to stop operation, and locally closing the respective rolling door or a brake enables the single wind-energy power machine to stop operation; it is also possible to select the opening and closing by manually controlling or manually operation through the control panel of the control system.

8. The wind-driven power generating system according to claim 7, wherein the vertical integration system connect the wind-energy power machines on several floors with the clutches or the couplings so as to constitute the large scale motor unit with large power, the wind-energy power machine with terminal power output connects a first transmission shaft with the clutch, a bevel gear on the shaft is engaged with a input shaft gear of a reduction gearbox, the power output shaft of the reduction gearbox is connected with the generator through the coupling, the generator is driven to generate electricity;

each of the wind-energy power machine is vertically installed on the installation frame with a bearing mounted on the shaft portion of the center rotating body; the installation frame is provided on the floor cross beam with a certain height, the lower portion forms a space which receives the clutch; the lower shaft portion of the center rotating body penetrates a through-hole of the middle installation frame, and the upper shaft portion of the center rotating body of the lower wind-energy power machine penetrates the installation window of the floor, they are connected by means of the clutches or couplings in this space, the installation frame is provided on the bottom or upper portion of the upper floor.

9. The wind-driven power generating system according to claim 7, wherein the horizontal integration system and the generator are provided between two motor units of the wind-energy power machines, the two wind-energy power machines transmit the power to a respective horizontal transmission shaft through a bevel gear of the respective center rotating body, again through the clutch connected with the horizontal common transmission shaft provided with a constant speed controller, transmission member to transmit power in order to drive the generator in operation to generate electricity; the transmission member be a sprocket or gear belt wheel or belt wheel or general gear, the transmission member may be a chain or gear belt or belt; the horizontal transmission shaft and the horizontal common transmission shaft are installed on a cross beam of the floor with a bracket and a bearing;

further, all the wind-energy power machines can also transmit power through a front transmission shaft with the clutch, one end of the shaft is engaged with the gear on the lower shaft portion of the center rotating body of the wind-energy power machine, the gear on the another end is engaged with the gear on the horizontal transmission shaft, each wind-energy power machine may output power or disconnect power through the clutch provided on the transmission shaft; each wind-energy power machine is vertically installed on the installation frame with the bearings provided on the upper and lower portions of the center rotating body.

* * * * *